(12) United States Patent
Yasui

(10) Patent No.: US 10,785,380 B2
(45) Date of Patent: Sep. 22, 2020

(54) NON-TRANSITORY COMPUTER-READABLE MEDIUM AND TERMINAL APPARATUS

(71) Applicant: BROTHER KOGYO KABUSHIKI KAISHA, Nagoya-shi, Aichi-ken (JP)

(72) Inventor: Ryo Yasui, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/440,155

(22) Filed: Feb. 23, 2017

(65) Prior Publication Data

US 2017/0251124 A1    Aug. 31, 2017

(30) Foreign Application Priority Data

Feb. 26, 2016 (JP) .................................. 2016-036051
Feb. 26, 2016 (JP) .................................. 2016-036056

(51) Int. Cl.
*G06F 3/12* (2006.01)
*H04N 1/32* (2006.01)
(Continued)

(52) U.S. Cl.
CPC ....... *H04N 1/32122* (2013.01); *G06F 3/0488* (2013.01); *G06F 3/1205* (2013.01);
(Continued)

(58) Field of Classification Search
None
See application file for complete search history.

(56) References Cited

U.S. PATENT DOCUMENTS

| 6,615,372 B1 * | 9/2003 | Wang ................. G06F 3/1229 347/19 |
| 2002/0101603 A1 * | 8/2002 | Christodoulou ...... G06F 3/1205 358/1.14 |

(Continued)

FOREIGN PATENT DOCUMENTS

| CN | 102848748 A | 1/2013 |
| JP | 2006-004160 A | 1/2006 |

(Continued)

OTHER PUBLICATIONS

Notification of First Office Action issued in related Chinese Patent Application No. 201710102455.8, dated Jul. 17, 2019.

(Continued)

*Primary Examiner* — Huo Long Chen
(74) *Attorney, Agent, or Firm* — Merchant & Gould P.C.

(57) ABSTRACT

A non-transitory computer-readable medium having a computer program for causing a terminal apparatus to perform a first display processing of displaying an execution instruction object, a reception processing of receiving status information from an image processing apparatus in response to detecting execution of a first operation on a position of the execution instruction object, a first determination processing of determining whether the image processing apparatus can execute an operation for image data on the basis of the received status information in response to detecting that the first operation on the position of the execution instruction object has changed to a second operation, and an execution instruction processing of transmitting execution instruction information for instructing execution of the operation to the image processing apparatus in response to it being determined in the first determination processing that the operation can be executed.

17 Claims, 13 Drawing Sheets

(51) Int. Cl.
*H04N 1/00* (2006.01)
*G06F 3/0488* (2013.01)
*G06F 9/451* (2018.01)

(52) U.S. Cl.
CPC .......... *G06F 3/1253* (2013.01); *G06F 3/1292* (2013.01); *H04N 1/00204* (2013.01); *H04N 1/00307* (2013.01); *H04N 1/00411* (2013.01); *H04N 1/00973* (2013.01); *G06F 9/451* (2018.02); *G06F 2203/04105* (2013.01); *H04N 2201/0075* (2013.01); *H04N 2201/0094* (2013.01)

(56) References Cited

U.S. PATENT DOCUMENTS

| | | | |
|---|---|---|---|
| 2007/0086052 A1* | 4/2007 | Furuya | H04L 67/16 358/1.15 |
| 2007/0216938 A1 | 9/2007 | Tomita | |
| 2010/0017710 A1* | 1/2010 | Kim | G06F 3/0414 715/702 |
| 2012/0242604 A1* | 9/2012 | Kato | H04N 1/00381 345/173 |
| 2012/0243043 A1 | 9/2012 | Asai | |
| 2013/0004223 A1 | 1/2013 | Hirabayashi et al. | |
| 2013/0235422 A1* | 9/2013 | Nakata | G06F 3/1205 358/1.15 |
| 2014/0104635 A1* | 4/2014 | Nishikawa | H04N 1/00238 358/1.14 |
| 2014/0355048 A1* | 12/2014 | Kang | G06F 3/1292 358/1.15 |
| 2014/0359438 A1 | 12/2014 | Matsuki | |
| 2016/0041673 A1* | 2/2016 | Liu | G06F 3/011 345/173 |
| 2017/0017447 A1* | 1/2017 | Saigusa | G06F 3/1255 |
| 2017/0160997 A1* | 6/2017 | Morita | G06F 3/1205 |

FOREIGN PATENT DOCUMENTS

| | | |
|---|---|---|
| JP | 2007-249461 A | 9/2007 |
| JP | 2010-287092 A | 12/2010 |
| JP | 2012-203742 A | 10/2012 |
| JP | 2013-70303 A | 4/2013 |
| JP | 2013-257770 A | 12/2013 |
| JP | 2015-139990 A | 8/2015 |

OTHER PUBLICATIONS

Office Action (Notice of Reasons for Refusal) issued in corresponding Japanese Patent Application No. 2016-036056, dated Nov. 5, 2019.

Nozawa Naoki, iPhone 6s/6s Plus Perfect Manual SoftBank, Japan, Sotec Co., Ltd., Oct. 20, 2015, first edition, pp. 22, 23.

Office Action issued in corresponding Japanese Patent Application No. 2016-036056, dated May 19, 2020.

* cited by examiner

FIG. 2A

| DESIGNATED APPARATUS ID | MFP-A |
|---|---|

FIG. 2B

| TRAY INFORMATION | TRAY 1 |
|---|---|
| COLOR INFORMATION | COLOR |
| RECORDING SURFACE INFORMATION | ONE SURFACE |
| LAYOUT INFORMATION | 2 IN 1 |

FIG. 2C

| TRAY INFORMATION | TRAY 1 | |
|---|---|---|
| COLOR INFORMATION | MONOCHROME | PAGE 2 |
| | COLOR | PAGES 1, 4, 5 |
| RECORDING SURFACE INFORMATION | ONE SURFACE | |
| LAYOUT INFORMATION | 2 IN 1 | |

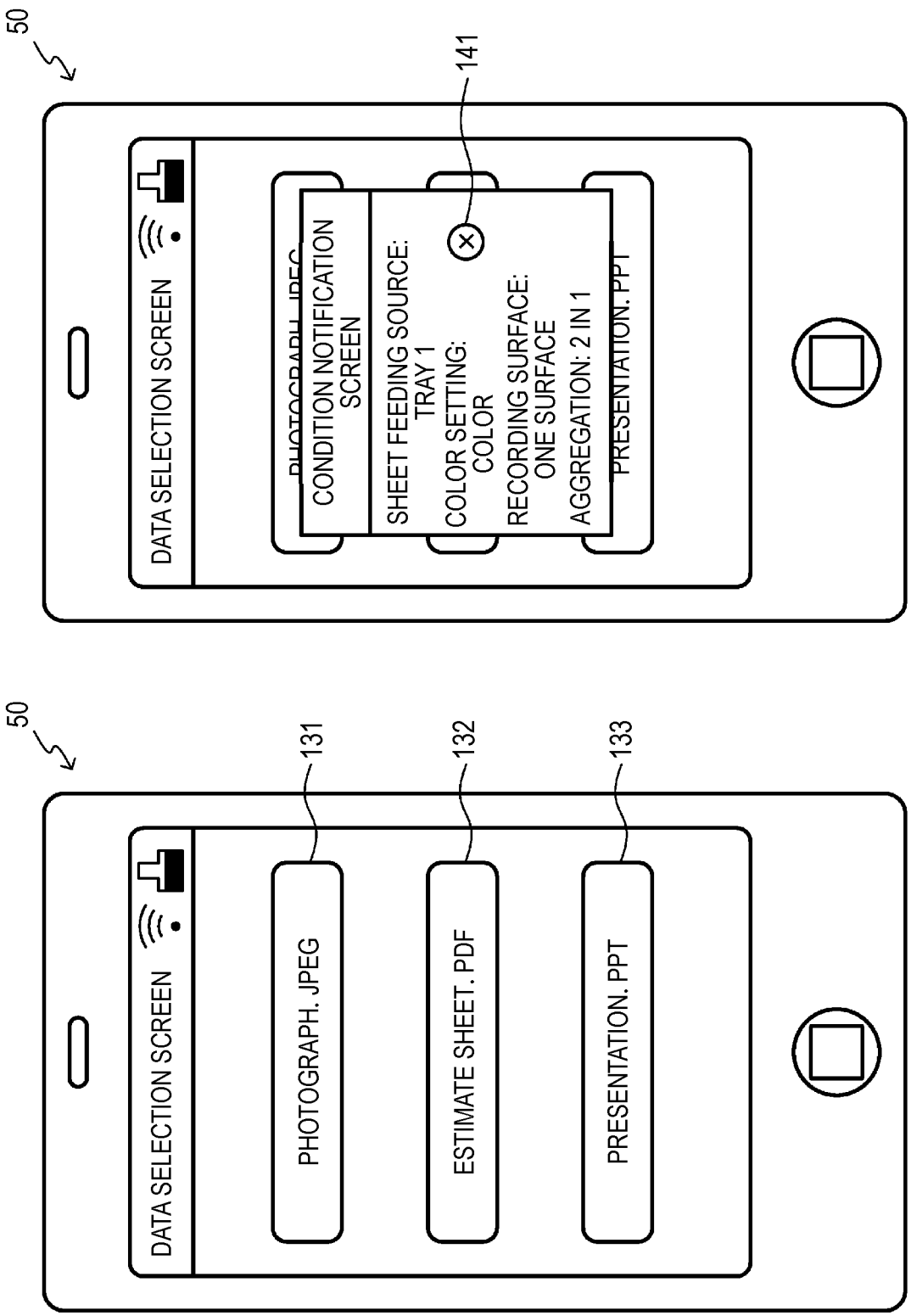

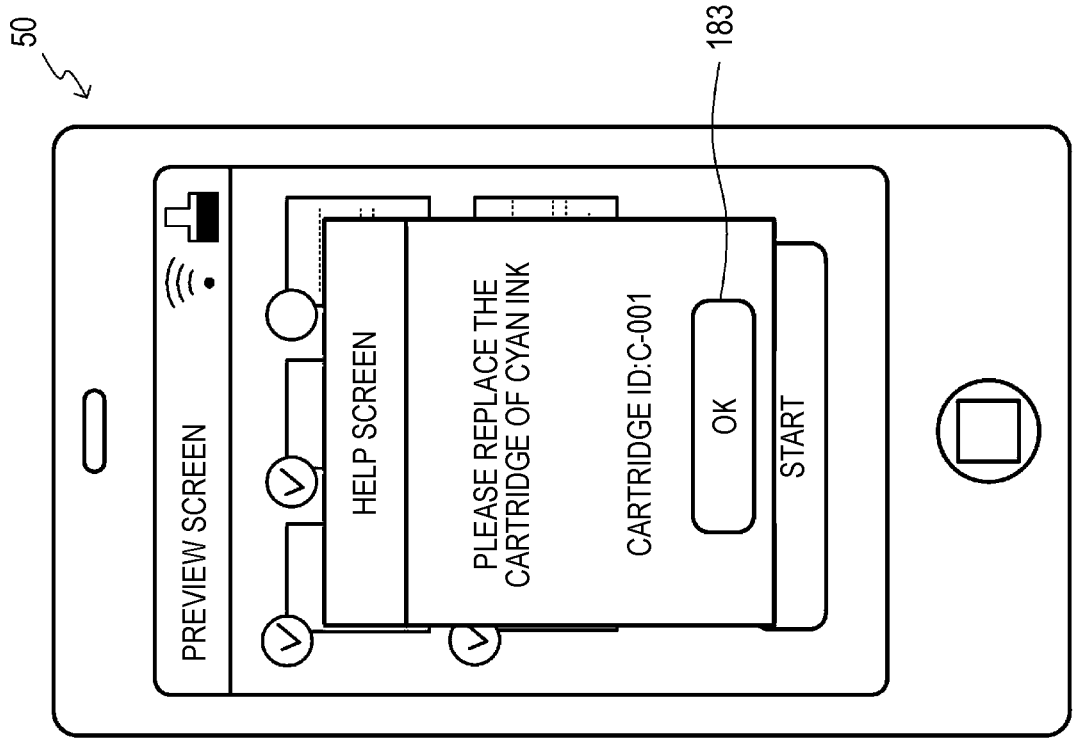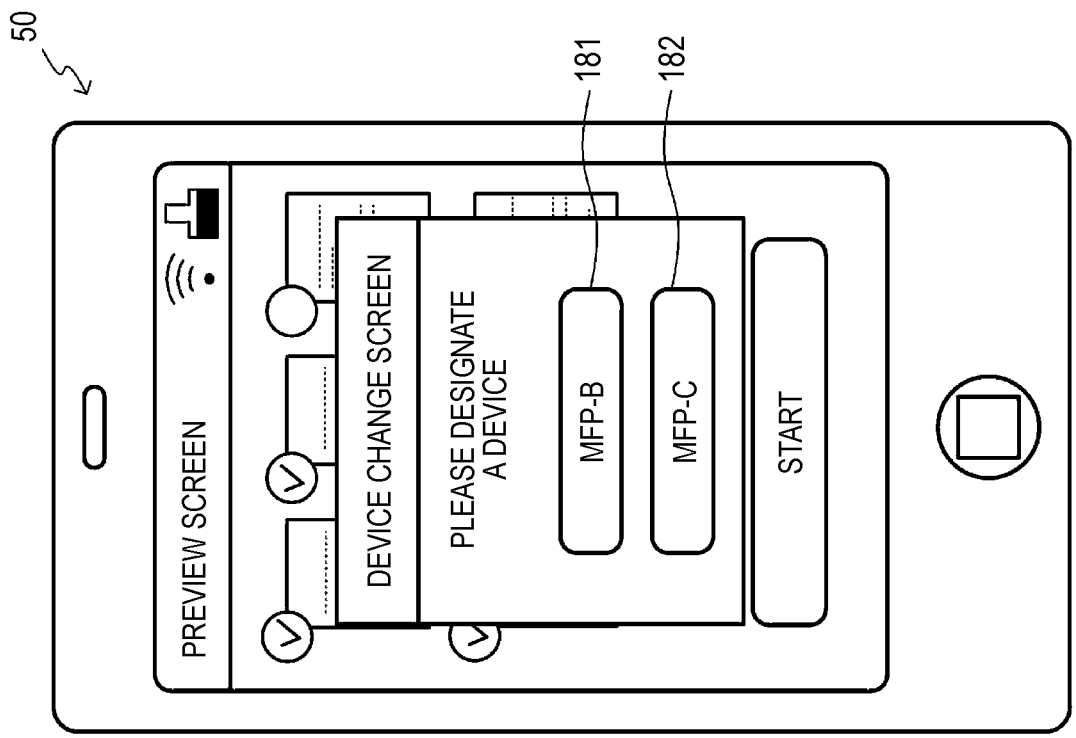

NON-TRANSITORY COMPUTER-READABLE MEDIUM AND TERMINAL APPARATUS

CROSS-REFERENCE TO RELATED APPLICATION

This application claims priority from Japanese Patent Application No. 2016-036051 filed on Feb. 26, 2016 and Japanese Patent Application No. 2016-036056 filed on Feb. 26, 2016, the entire subject-matters of which are incorporated herein by reference.

TECHNICAL FIELD

The disclosure relates to a computer-readable medium having a computer program configured to operate a terminal apparatus in response to a user's instruction through a touch panel.

BACKGROUND

There has been proposed a terminal application configured to enable a user to designate contents data and to enable an image processing apparatus to execute an operation relating to the designated contents data. For example, a related-art application instructs a printer to execute a print operation for scanner data when a print button is touched.

A user who uses the application having the above configuration may want to check a status of the printer and/or execution conditions of the print operation before touching the print button. However, according to the related-art application, the status of the printer and/or the execution conditions of the print operation is displayed on a display in response to a button other than the print button is touched. Therefore, a user operation after the status of the printer and/or the execution conditions of the print operation are checked until the printer is instructed to execute the print operation becomes troublesome.

SUMMARY

One illustrative aspect of the disclosure provides a computer-readable medium having a computer program for a terminal apparatus capable of implementing a check of a status of an image processing apparatus and an operation instruction to the image processing apparatus by a simple operation.

Another illustrative aspect of the disclosure provides a computer-readable medium having a computer program for a terminal apparatus capable of implementing a check of an execution condition and an execution instruction of processing associated with an icon by a simple operation.

According to one aspect of the disclosure, there may be provided a non-transitory computer-readable medium having a computer program stored thereon and readable by a computer of a terminal apparatus, the terminal apparatus comprising a display having a display surface, a touch sensor arranged with being superimposed on the display surface and configured to detect a touch operation, and a communication device, the computer program, when executed by the computer, causing the terminal apparatus to perform: displaying an execution instruction object on the display surface; receiving status information from an image processing apparatus through the communication device in response to the touch sensor detecting that a first operation is executed on a position of the execution instruction object, the status information being information indicative of a status of the image processing apparatus; determining whether the image processing apparatus can execute an operation for image data on the basis of the received status information in response to the touch sensor detecting that the first operation on the position of the execution instruction object has changed to a second operation; and transmitting execution instruction information for instructing execution of the operation to the image processing apparatus through the communication device in response to it being determined that the operation can be executed.

According to another aspect of the disclosure, there may be provided a terminal apparatus comprising: a display having a display surface; a touch sensor arranged with being superimposed on the display surface and configured to detect a touch operation; a communication device; and a controller configured to: display an execution instruction object on the display surface; receive status information from an image processing apparatus through the communication device in response to the touch sensor detecting that a first operation is executed on a position of the execution instruction object, the status information being information indicative of a status of the image processing apparatus; determine whether the image processing apparatus can execute an operation for image data on the basis of the received status information in response to the touch sensor detecting that the first operation on the position of the execution instruction object has changed to a second operation; and transmit execution instruction information for instructing execution of the operation to the image processing apparatus through the communication device in response to it being determined that the operation can be executed.

According to the above configuration, when the status information of the image processing apparatus is received by the first operation on the execution instruction object and the first operation changes to the second operation, it is determined whether an execution is to be executed, on the basis of the status information. When it is determined that the operation can be executed, the image processing apparatus is instructed to execute the operation. That is, the user of the terminal apparatus can implement a check of the status of the image processing apparatus and an operation instruction to the image processing apparatus by the simple operation.

According to still another aspect of the disclosure, there may be provided a non-transitory computer-readable medium having a program stored thereon and readable by a computer of a terminal apparatus, the terminal apparatus comprising a display having a display surface, a touch sensor arranged with being superimposed on the display surface and configured to detect a touch operation, and a memory, the computer program, when executed by the computer, causing the terminal apparatus to perform: displaying an object, which is associated with association processing that the terminal apparatus is to perform, on the display surface; and displaying an execution condition of the association processing, which is indicated by condition information stored in the memory, in response to the touch sensor detecting that a first operation is executed on a position of the object, wherein the computer program causes the terminal apparatus to perform the association processing in accordance with the execution condition in response to the touch sensor detecting that the first operation on the position of the object has changed to a second operation.

According to the above configuration, when the execution condition is notified by the first operation on the object and the first operation changes to the second operation, the association processing is executed. That is, the user of the terminal apparatus can implement a check of the execution condition and an execution instruction of the association processing by the simple operation.

According to still another aspect of the disclosure, there may be provided a non-transitory computer-readable medium having a computer program stored thereon and readable by a terminal apparatus, the terminal apparatus comprising a display having a display surface, a touch sensor arranged with being superimposed on the display surface and configured to detect a touch operation, a memory and a communication device, the computer program, when executed by the computer, causing the terminal apparatus to perform: displaying a first screen on the display surface, the first screen comprising a plurality of objects each of which is associated with image data; displaying an execution condition, which is indicated by condition information stored in the memory, on the display surface in response to the touch sensor detecting that a first operation is executed on the first screen; deciding the image data corresponding to the object as designated data in response to the touch sensor detecting that the first operation on a position of the object has changed to a second operation; and transmitting execution instruction information to an image processing apparatus through the communication device in response to the touch sensor detecting that a touch operation of instructing an output of the designated data is executed, the execution instruction information being information for instructing an output operation of outputting the designated data in accordance with the execution condition.

According to the above configuration, when the execution condition is notified by the first operation on the object and the first operation changes to the second operation, the corresponding image data is decided as the designated data. That is, the user of the terminal apparatus can implement the check of the execution condition and the designation of the designated data by the simple operation.

BRIEF DESCRIPTION OF THE DRAWINGS

FIGS. 2A to 2C depict examples of data to be stored in a memory 62, in which FIG. 2A depicts a designated apparatus ID, FIG. 2B depicts condition information, and FIG. 2C depicts the condition information updated in S56;

FIGS. 7A and 7B depict display examples of a display 53, in which FIG. 7A depicts a main screen, and FIG. 7B depicts a status screen;

FIGS. 8A and 8B depict display examples of the display 53, in which FIG. 8A depicts a data selection screen, and FIG. 8B depicts a condition notification screen superimposed on the data selection screen;

FIGS. 9A and 9B depict display examples of the display 53, in which FIG. 9A depicts a condition change screen superimposed on the data selection screen, and FIG. 9B depicts a preview screen;

FIGS. 10A and 10B depict display examples of the display 53, in which FIG. 10A depicts an individual notification screen superimposed on the preview screen, and FIG. 10B depicts an individual change screen superimposed on the preview screen;

FIGS. 11A and 11B depict display examples of the display 53, in which FIG. 11A depicts an entire notification screen superimposed on the preview screen, and FIG. 11B depicts an entire change screen superimposed on the preview screen;

FIGS. 12A and 12B depict display examples of a status notification screen superimposed on the preview screen, in which FIG. 12A depicts a case where a print operation can be executed, and FIG. 12B depicts a case where the print operation cannot be executed; and FIGS. 13A and 13B depict display examples of the display 53, in which FIG. 13A depicts a device change screen superimposed on the preview screen, and FIG. 13B depicts a help screen superimposed on the preview screen.

DETAILED DESCRIPTION

Hereinafter, an illustrative embodiment of the disclosure will be described with reference to the drawings. In the meantime, the illustrative embodiment to be described later is just an example of the disclosure and the illustrative embodiment of the disclosure can be appropriately changed without departing from the scope of the disclosure. For example, an execution sequence of each processing to be described later can be appropriately changed without departing from the gist of the disclosure.

Figure 1:
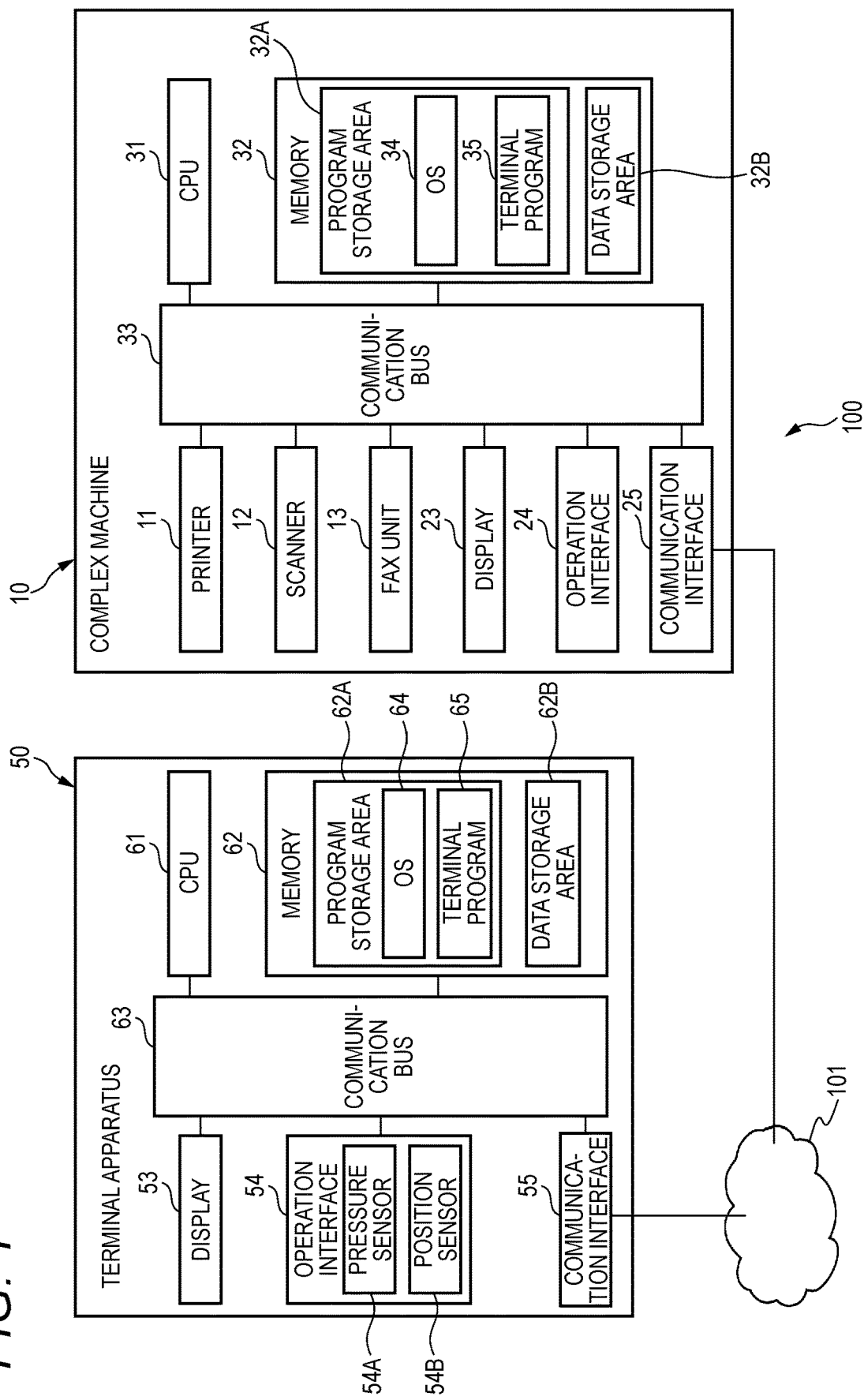
FIG. 1 is a block diagram of a complex machine 10 and a terminal apparatus 50 configuring a system 100 in accordance with an illustrative embodiment.

FIG. 1 depicts an outline of a system 100 in accordance with the illustrative embodiment. The system 100 shown in FIG. 1 includes a complex machine 10 and a terminal apparatus 50. In the meantime, the system 100 may include a plurality of complex machines 10. Also, the system 100 may include a single function machine of a printer, a single function machine of a scanner, a single function device of a FAX, and the like, instead of the complex machine 10. The complex machine 10 and the terminal apparatus 50 are configured to perform communication via a communication network 101. The communication network 101 may be a wired LAN, a wireless LAN 102 or a combination thereof.

As shown in FIG. 1, the complex machine 10 mainly has a printer 11, a scanner 12, a FAX unit 13, a display 23, an operation interface 24, a communication interface 25, a CPU 31, a memory 32 and a communication bus 33. The respective constitutional elements of the complex machine 10 are connected each other through a communication bus 33. The complex machine 10 is one example of an image processing apparatus.

The printer 11 is configured to execute a recording operation of recording an image expressed by image data onto a sheet. As a recording method of the printer 11, a well-known method such as an inkjet method and an electrophotographic method can be adopted. The scanner 12 is configured to execute a scan operation of reading an image recorded on a document and to generate image data. The FAX unit 13 is configured to execute a FAX transmission operation of FAX-transmitting image data in accordance with a FAX protocol and a FAX reception operation of FAX-receiving image data in accordance with the FAX protocol.

Also, the complex machine 10 may be configured to execute a copy operation of recording the image data generated in the scan operation onto a sheet in the print operation, and may also be configured to execute an operation of outputting the image data generated in the scan operation to a designated output destination (for example, the terminal apparatus 50, a server (not shown) or the like). The print operation, the scanner operation, the copy operation, the FAX transmission operation and the FAX reception operation are examples of the operation of the image processing apparatus. The print operation and the FAX transmission operation are examples of the output operation.

The display 23 is a liquid crystal monitor, an organic EL display or the like, and has a display surface for displaying a variety of information.

The operation interface 24 is a user interface configured to receive a user's input operation. Specifically, the operation interface 24 has buttons, and is configured to output a variety of operation signals associated with the pushed buttons to the CPU 31. Also, the operation interface 24 may have a film-shaped touch sensor superimposed on the display surface of the display 23. An operation of designating an object displayed on the display surface of the display 23 and an operation of inputting a character string or a number string are examples of the user operation. The "object" indicates a character string, an icon, a button, a link, a radio button, a check box, a pull-down menu and the like displayed on the display 23.

The operation interface 24 implemented as a touch sensor is configured to output position information, which indicates a position on the display surface touched by the user. Meanwhile, in the specification, the term "touch" includes all operations of enabling an input medium to contact the display surface. Also, even when the input medium is not in contact with the display surface, "hover" or "floating touch" of bringing the input medium close to a position at which a distance to the display surface is very small may be included in the concept of the "touch". Also, the input medium may be a user's finger, a touch pen or the like. A user operation of tapping a position of an icon displayed on the display 23 is one example of a designation operation of designating the icon.

The communication interface 25 is an interface for performing communication with an external apparatus through the communication network 101. That is, the complex machine 10 is configured to transmit a variety of information to the terminal apparatus 50 through the communication interface 25 and to receive a variety of data or information from the terminal apparatus 50 through the communication interface 25. The specific communication protocol of the communication interface 25 is not particularly limited but Wi-Fi (a registered trademark of Wi-Fi Alliance) may be adopted, for example. The specific example of the communication interface 25 is not limited to the above examples, and may be an interface to which a LAN cable or a USB cable is to be detachably mounted, or the like, for example.

The CPU 31 is configured to control an overall operation of the complex machine 10. The CPU 31 is configured to acquire and execute a variety of programs (which will be described later) from the memory 32, based on diverse signals to be output from the operation interface 24, a variety of information acquired from the external apparatus through the communication interface 25, and the like. That is, the CPU 31 and the memory 32 configure one example of a control unit.

The memory 32 has a program storage area 32A and a data storage area 32B. In the area 32A, an OS 34 and an apparatus program 35 are stored. In the meantime, the apparatus program 35 may be a single program or a combination of a plurality of programs. In the area 32B, data or information necessary to execute the apparatus program 35 is stored. The memory 32 may be a RAM, a ROM, an EEPROM, a HDD, a portable storage medium such as a USB memory to be detachably mounted to the complex machine 10, a buffer of the CPU 31 or a combination thereof.

The memory 32 may be a computer-readable storage medium. The computer-readable storage medium is a non-transitory medium. The non-transitory medium includes a recording medium such as a CD-ROM and a DVD-ROM, in addition to the above-described medium. Also, the non-transitory medium is a tangible medium. In the meantime, an electric signal for carrying a program to be downloaded from the server on the Internet is a computer-readable signal medium, which is one of the computer-readable media, but is not included in the non-transitory computer-readable storage medium. This also applies to a memory 62 of the terminal apparatus 50, which will be described later.

When transmission request information is received from the terminal apparatus 50 through the communication interface 25, the apparatus program 35 transmits status information to the terminal apparatus 50 through the communication interface 25, as a response to the transmission request information. The status information is information indicative of a status of the complex machine 10. More specifically, the status information is information, which indicates whether the complex machine 10 is at a state at which it can execute a variety of operations. The status information includes a part or all of items as described below, for example. The variety of information included in the status information may be stored in the memory 32 or may be detected by a well-known sensor.

In the illustrative embodiment, the status information includes ink information and sheet information. The ink information indicates a remaining amount of ink in an ink cartridge mounted to the printer 11. In the illustrative embodiment, the ink information indicates remaining amounts of cyan ink, magenta ink, yellow ink and black ink, respectively. The sheet information indicates an amount of sheets accommodated in a sheet feeding tray mounted to the printer 11.

Also, the status information may include duplex printing information, which indicates whether an image can be recorded on both surfaces of a sheet. Also, the status information may include aggregation information, which indicates whether N (N=1, 2, 4, 9, . . . ) images can be recorded with being aggregated on one sheet. Also, the status information may include size information, which indicates a size of a sheet accommodated in the sheet feeding tray. Also, when the printer 11 adopts an electrophotographic method, the status information may include toner information, which indicates a remaining amount of toner in the toner cartridge mounted to the printer 11.

Also, the status information may include management information. The management information is information that can be seen only by a manager of the complex machine 10, and may include performance information indicative of operation performance of the printer 11, security information indicative of contents of a security set for the printer 11, and the like. The performance information may indicate the number of accumulated rotations of a drum mounted to the printer 11, the number of accumulated sheets on which the printer 11 has recorded images, and the like, for example. The security information may indicate whether a so-called SFL (abbreviation of Secure Function Lock) for allowing only a specific user to use the complex machine is set for the complex machine 10, for example.

In the meantime, the specific examples of the status information are items indicative of whether the printer 11 can execute the print operation. However, the items to be included in the status information are not limited thereto, and may include an item indicative of whether the scanner 12 can execute the scan operation and an item indicative of whether the FAX unit 13 can execute the FAX transmission operation or the FAX reception operation.

As shown in FIG. 1, the terminal apparatus 50 mainly has a display 53, an operation interface 54, a communication interface 55, a CPU 61, a memory 62, and a communication bus 63. Since the display 53, the communication interface 55, the CPU 61, the memory 62 and the communication bus 63 included in the terminal apparatus 50 have the same configurations as the display 23, the communication interface 25, the CPU 31, the memory 32 and the communication bus 33 included in the complex machine 10, the descriptions thereof are omitted. The CPU 61 and the memory 62 configure one example of a control unit. The specific example of the terminal apparatus 50 is not particularly limited but may be a portable phone, a smart phone, a tablet terminal, a PC or the like, for example.

The display 53 has a display surface for displaying a variety of screens. The display surface may be a plate-shaped transparent member (for example, a glass plate or the like) exposed from a surface of the terminal apparatus 50. The description "displaying a variety of screens on the display surface" indicates a state where a screen displayed by the display 53 can be visually recognized through the display surface by the user.

The operation interface 54 is an input interface for receiving a variety of inputs made by the user. In the illustrative embodiment, the operation interface 54 has film-shaped pressure sensor 54A and position sensor 54B superimposed on the display surface of the display 53. That is, the display 23 is configured as a touch panel display. The pressure sensor 54A and the position sensor 54B are examples of the touch sensor configured to output an operation signal in accordance with a touch operation on the display surface of the display 53, i.e., the glass plate exposed from the surface of the terminal apparatus 50.

The pressure sensor 54A is configured to output a pressure signal corresponding to a pressure applied to the display surface by the input medium to the CPU 61. When the display surface is pressed with a pressure lower than a first pressure, the pressure sensor 54A outputs a first pressure signal. Also, when the display surface is pressed with a pressure equal to or higher than the first pressure and lower than a second pressure, the pressure sensor 54A outputs a second pressure signal. Also, when the display surface is pressed with a pressure equal to or higher than the second pressure, the pressure sensor 54A outputs a third pressure signal. In the meantime, the second pressure is higher than the first pressure. Alternatively, the pressure sensor 54A may be configured to output a pressure signal indicative of a pressure value applied to the display surface to the CPU 61. In this case, the CPU 61 is configured to compare the pressure value indicated by the pressure signal and a threshold.

The position sensor 54B is configured to a position signal corresponding to a position of the display surface, to which a pressure is applied by the input medium, to the CPU 61. The position signal indicates coordinates (x,y) on an x-y plane where a left-upper end of the display surface is an origin, a rightward direction is defined as a positive direction of an X axis and a downward direction is defined as a positive direction of a Y axis, for example. Also, when the touch operation is continuously performed on the display surface, the position sensor 54B repeatedly outputs the position signal every predetermined detection period (for example, 10 msec).

Meanwhile, in the specification, the term "touch" includes all operations of enabling the input medium to contact the display surface. That is, a long touch operation, a pinch-in operation, a pinch-out operation and the like are examples of the touch operation, in addition to the above-described tap operation, and a peek operation, a pop operation, a slide operation and a flick operation, which will be described later. The peek operation is one example of a first operation, the pop operation is one example of a second operation, the slide operation or the flick operation is one example of a third operation, and the tap operation is one example of a fourth operation.

More specifically, when the first pressure signal is output from the pressure sensor 54A, the operation interface 54 detects that the tap operation has been executed at a position indicated by the position signal output from the position sensor 54B. When the second pressure signal is output from the pressure sensor 54A, the operation interface 54 detects that the peek operation has been executed at a position indicated by the position signal output from the position sensor 54B. When the third pressure signal is output from the pressure sensor 54A, the operation interface 54 detects that the pop operation has been executed at a position indicated by the position signal output from the position sensor 54B. When the position indicated by the position signal output from the position sensor 54B continuously changes, the operation interface 54 detects that the slide operation or the flick operation has been executed.

As shown in FIG. 2A, for example, the area 62B can store therein a designated apparatus ID. The designated apparatus ID is apparatus identification information for identifying an image processing apparatus designated by the user (hereinafter, referred to as "designated apparatus"). The designated apparatus ID is not stored in the area 62B upon install of the terminal program 65 and is stored in the area 62B by the terminal program 65 in S13, S46 and the like (which will be described later), for example. Also, the area 62B may be configured to further associate and store therein communication information (for example, an IP address, a MAC address, an SSID and the like) for specifying the designated apparatus in the communication network 101, an operation ID for identifying an operation to be executable by the designated apparatus, and the like with the designated apparatus ID.

Also, the area 62B can store therein condition information indicative of execution condition of the print operation, as shown in FIG. 2B, for example. The condition information is not stored in the area 62B upon the install of the terminal program 65 and is stored in the area 62B by the terminal program 65 in S46, S56, S62 and the like, for example. In the illustrative embodiment, the condition information includes tray information, color information, recording surface information, and layout information. Also, the designated apparatus ID may be included in the condition information. Also, the area 62B may be configured to further store therein the condition information indicative of execution conditions of each of the scan operation, the FAX transmission operation and the FAX reception operation.

The tray information is information for specifying a tray of a sheet feeding source of the sheet on which an image is to be recorded in the print operation. The color information is information indicative of colors (for example, "monochrome", "color") to be used in the print operation. The recording surface information is information indicative of a surface (for example, "one surface", "both surfaces") of the sheet on which an image is to be recorded. The layout information is information indicative of the number N of images (for example, "no aggregation", "2in1", "4in1" and the like) to be recorded with being aggregated on one sheet.

That is, the condition information shown in FIG. 2B indicates that two color images are recorded with being aggregated on one surface of a sheet accommodated in a tray 1. The tray information, the color information, the recording surface information and the layout information are examples of the items to be included in the condition information.

Also, although not shown, the area 62B may be provided with a data folder. In the data folder, photograph data, document data, presentation data, table calculation data and the like may be stored. In the meantime, the data to be stored in the data folder includes one or more page data. The page data is data indicative of an image to be recorded on one sheet when the layout information is "no aggregation." Also, although not shown, the area 62B is configured to store therein information (for example, a continuation flag) necessary for processing that is to be executed by the terminal program 65.

Operations of the system 100 in accordance with the illustrative embodiment are described with reference to FIGS. 3 to 6.

A flowchart of the specification basically indicates processing of the CPUs 31, 61, which is to be executed in accordance with commands described in the programs. That is, in the below descriptions, processing such as "determination", "extraction", "calculation", "selection", "control" and the like indicates processing of the CPUs 31, 61. The processing that is to be executed by the CPU 61 includes hardware control via the OS 64, too. Also, in the specification, the term "data" is expressed by a computer-readable bit string. It is assumed that the data having the substantially same meaning and a different format is to be handled as the same data. This also applies to the "information" in the specification.

Figure 3:
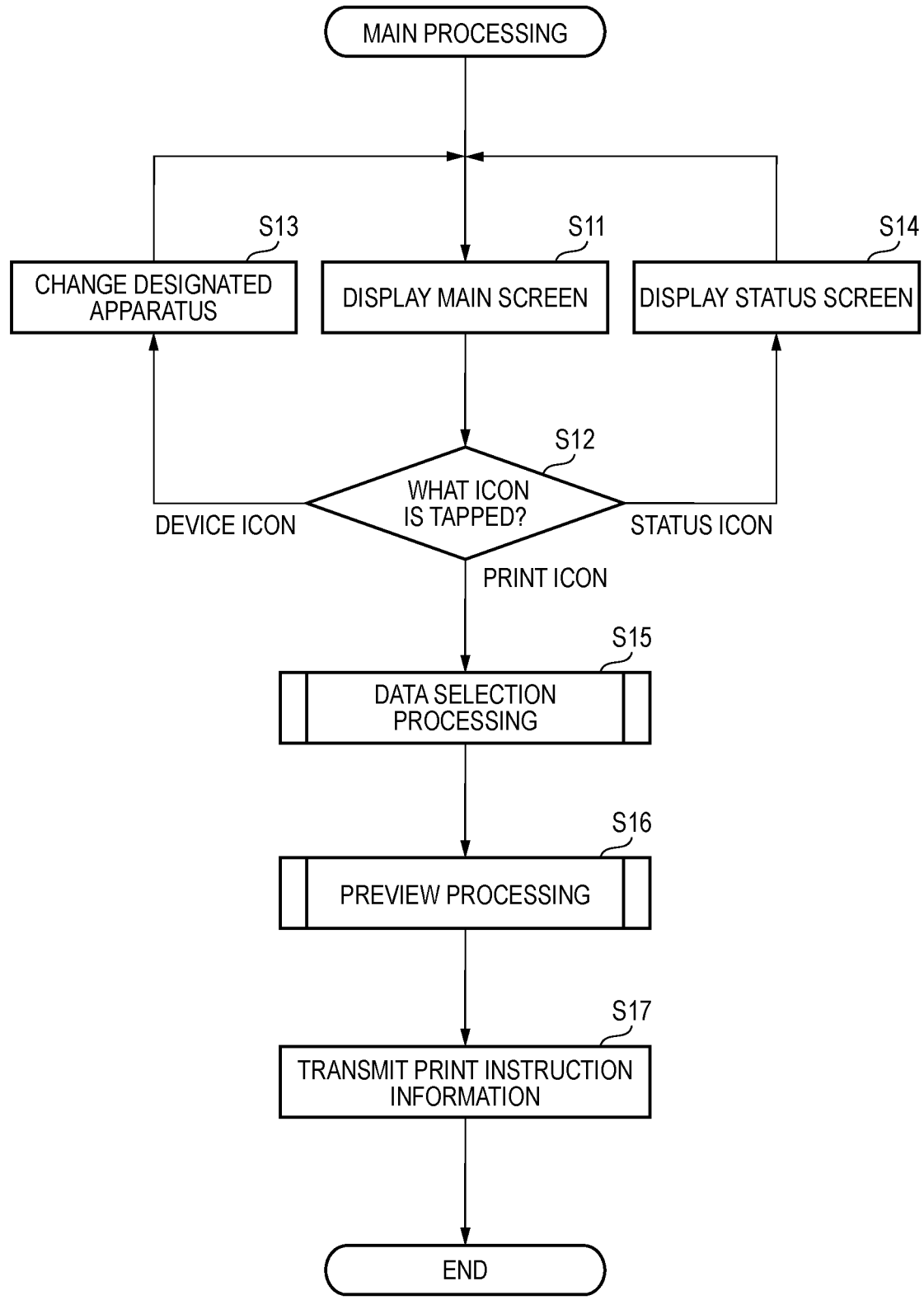
FIG. 3 is a flowchart of main processing.
Figure 4:
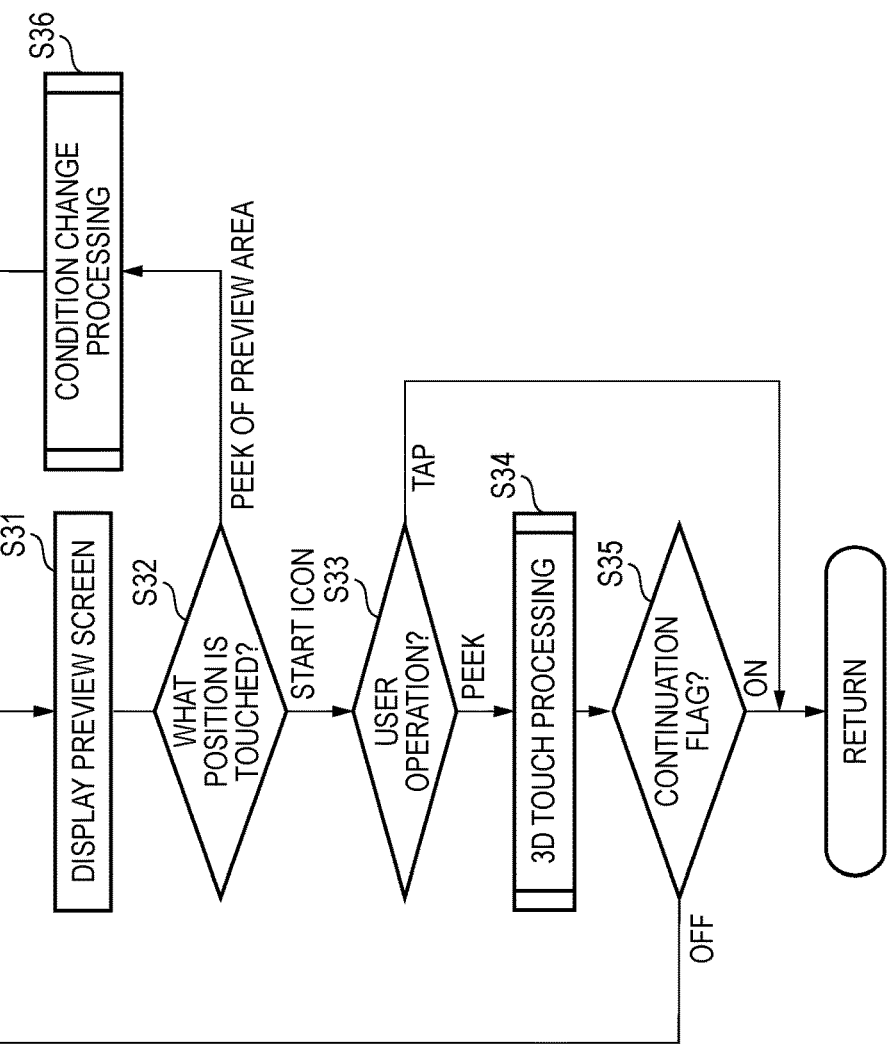
FIG. 4A is a flowchart of data selection processing.
FIG. 4B is a flowchart of preview processing.
Figure 5:
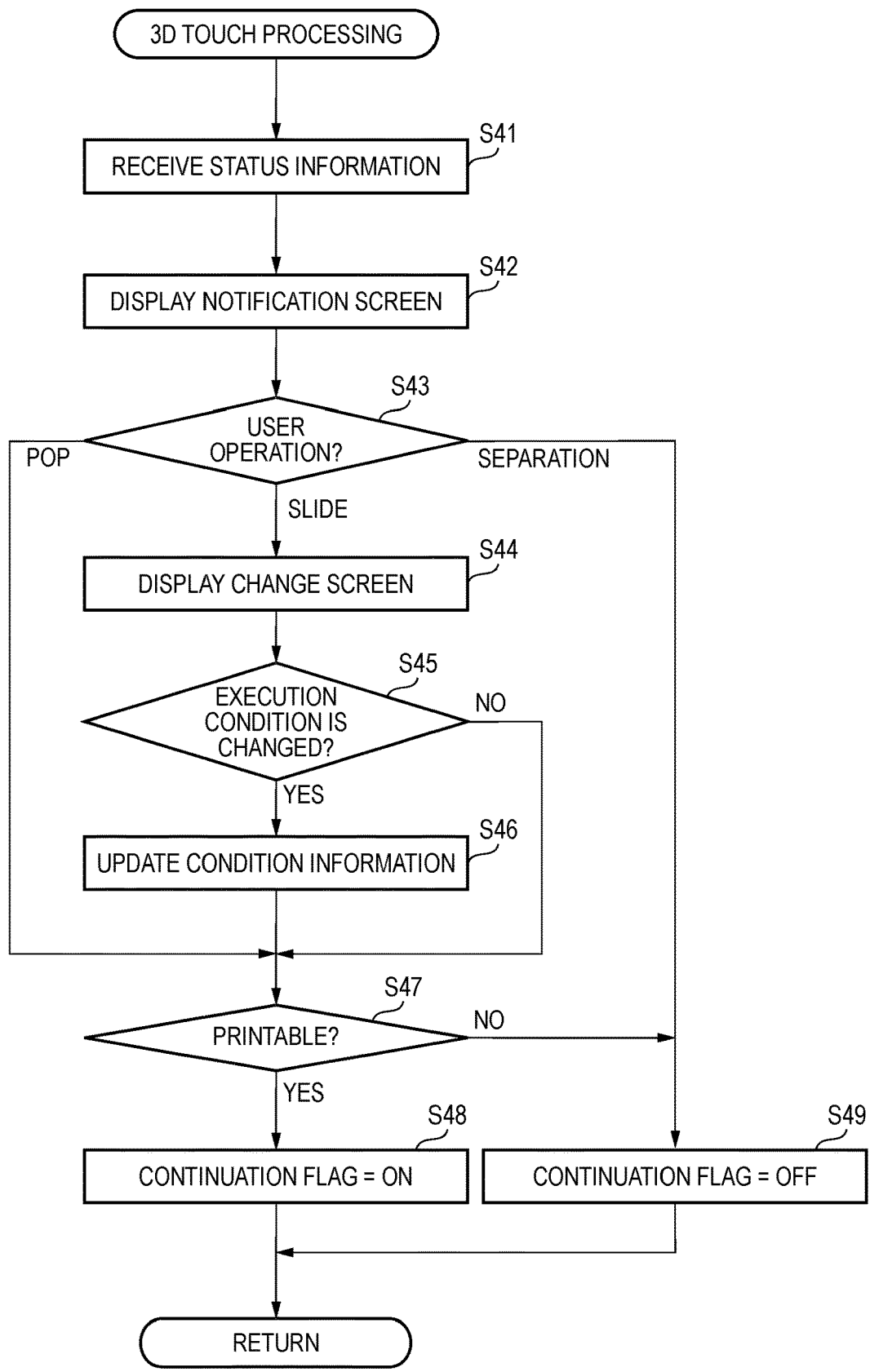
FIG. 5 is a flowchart of 3D touch processing.
Figure 6:
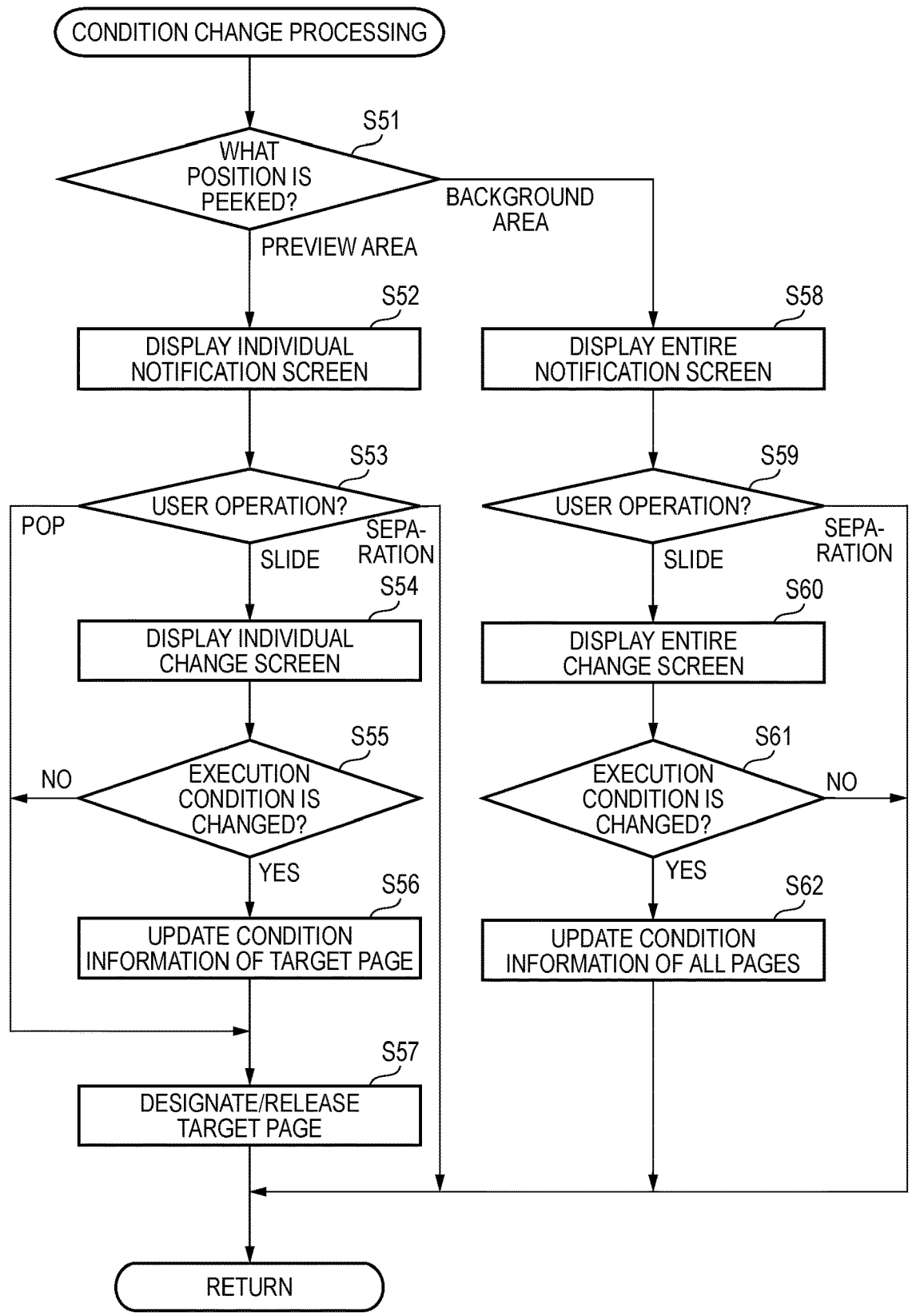
FIG. 6 is a flowchart of condition change processing.

When activated by the user, the terminal program 65 of the terminal apparatus 50 executes main processing shown in FIG. 3. First, the terminal program 65 displays a main screen shown in FIG. 7A on the display 53 (S11). The main screen includes operation icons 111, 112, 113, 114, a status icon 115 and a device icon 116. The terminal program 65 receives a user operation on the main screen through the operation interface 54 (S12).

The operation icon 111 corresponds to the print operation, the operation icon 112 corresponds to the scan operation, the operation icon 113 corresponds to the copy operation, and the operation icon 114 corresponds to the FAX transmission operation and the FAX reception operation. The status icon 115 corresponds to an instruction to display a status screen indicative of a status of the designated apparatus. The device icon 116 corresponds to an instruction to switch the designated apparatus. Also, in the device icon 116 shown in FIG. 7A, a designated apparatus ID "MFP-A" stored in the area 62B is described.

Then, when the operation interface 54 detects a tap operation on a position of the device icon 116 (S12: device icon), the terminal program 65 receives a user operation of designating or changing the designated apparatus, through the operation interface 54 (S13). More specifically, the terminal program 65 searches the image processing apparatuses connected to the communication network 101, displays a list of the found image processing apparatuses on the display 53, receives a user operation of designating one of the listed image processing apparatuses through the operation interface 54, and stores an apparatus ID of the designated image processing apparatus in the area 62B, as the designated apparatus ID. Then, the terminal program 65 re-executes the processing of S11 and thereafter. When the designated apparatus is changed in S13, a new designated apparatus ID is described in the device icon 116 of the main screen.

Figure 7B:
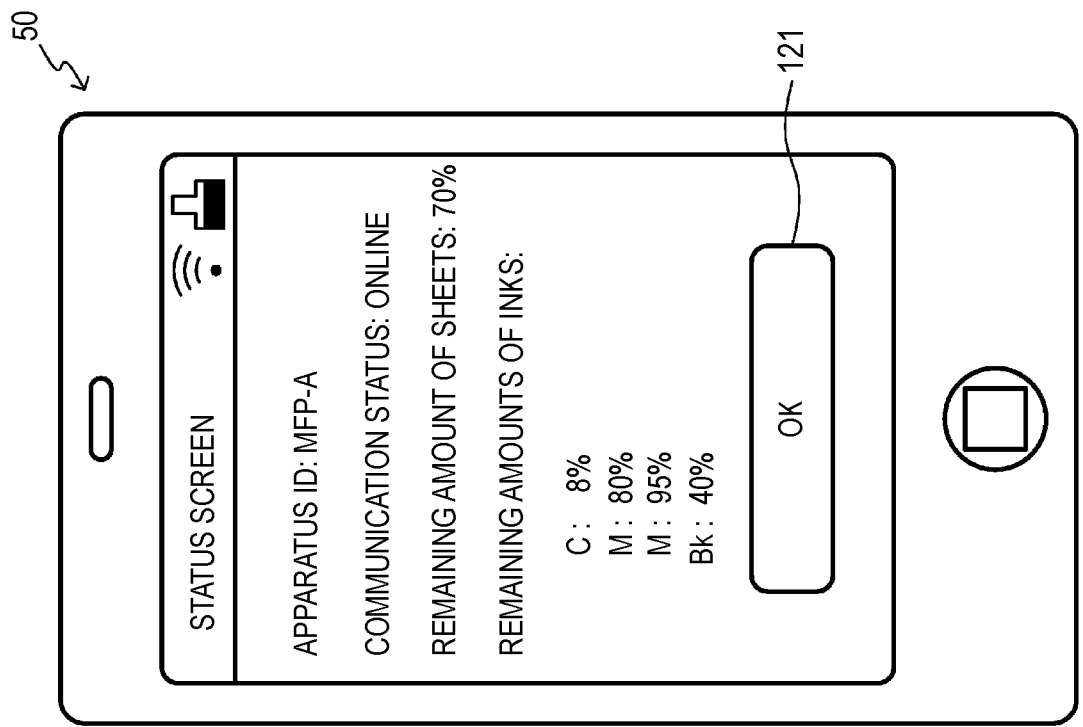
Figure 7A:
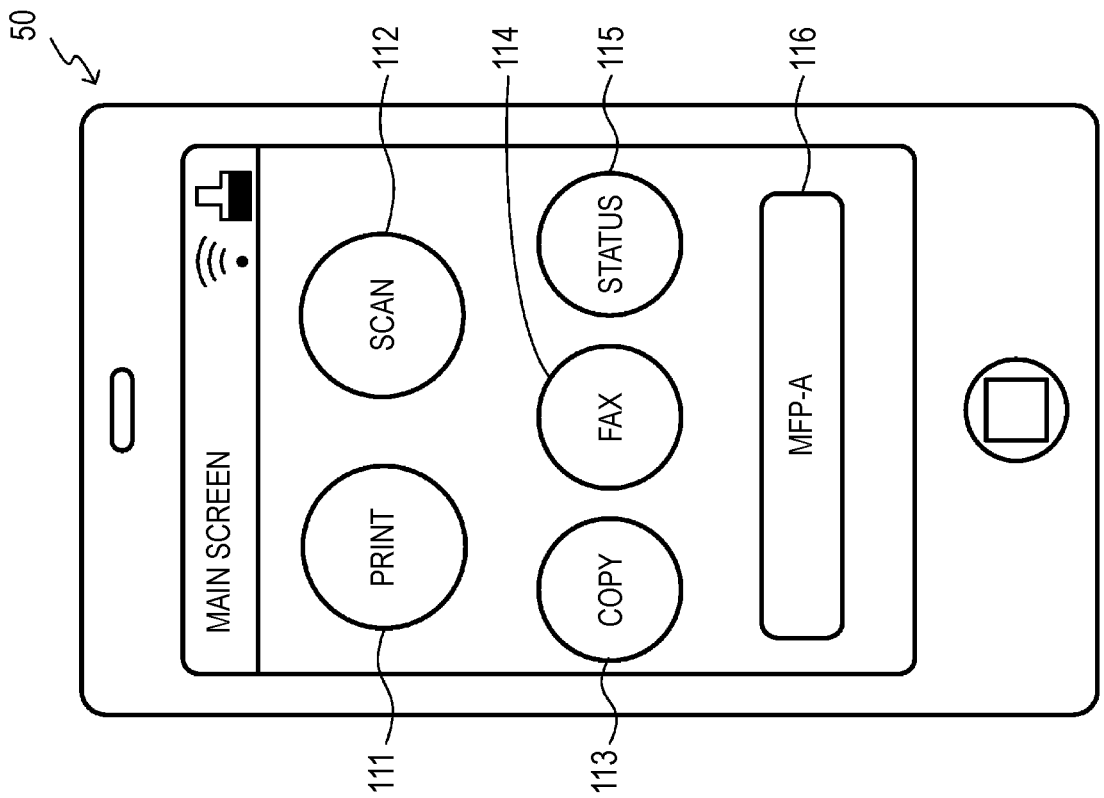

Then, when the operation interface 54 detects a tap operation on a position of the status icon 115 (S12: status icon), the terminal program 65 displays a status screen shown in FIG. 7B on the display 53 (S14). The status screen includes a designated apparatus ID, a communication status, a remaining amount of the sheets, the remaining amounts of inks, and an [OK] icon 121. More specifically, the terminal program 65 transmits transmission request information to the complex machine 10, which is the designated apparatus, through the communication interface 55, and receives status information transmitted from the complex machine 10 as a response to the transmission request information, through the communication interface 55. Then, the terminal program 65 displays a status of the complex machine 10 indicated by the received status information on the status screen.

The apparatus ID is the designated apparatus ID stored in the area 62B. The communication status indicates whether it is possible to perform communication with the designated apparatus, and "online" is displayed when the status information is received and "offline" is displayed when the status information is not received. Also, since the status information is not received at the offline status, the remaining amount of sheets and the remaining amounts of inks are displayed only as to the item names thereof on the status screen. The remaining amount of sheets is a remaining amount of sheets indicated by the sheet information included in the status information. The remaining amounts of inks are remaining amounts of inks indicated by the ink information included in the status information. When the operation interface 54 detects a tap operation on a position of the [OK] icon 121, the terminal program 65 re-executes the processing of S11 and thereafter.

Then, when the operation interface 54 detects a tap operation on a position of the operation icon 111 (S12: print icon), the terminal program 65 decides the print operation, as a designated operation. Hereinafter, the processing of step S15 and thereafter is described on the assumption that the print operation is decided as the designated operation. When another operation is decided as the designated operation, processing relating to each operation is executed. The terminal program 65 executes data selection processing (S15). The data selection processing is processing of enabling the user to select data becoming a target of the print operation (hereinafter, referred to as "designated data"). The data selection processing is described in detail with reference to FIG. 4A.

First, the terminal program 65 displays a data selection screen shown in FIG. 8A on the display 53 (S21). The processing of step S21 is one example of the first display processing. The data selection screen includes a plurality of data icons 131, 132, 133. The data icons 131 to 133 are examples of the data objects corresponding to a variety of data stored in the data folder or a variety of data stored in a server (not shown) on the Internet. The terminal program 65 receives a user operation on the data selection screen, through the operation interface 54 (S22).

Then, when the operation interface 54 detects a peek operation on a position of the data icon 133 (S22: peek), for example, the terminal program 65 executes 3D touch processing (S23). The 3D touch indicates a function capable of allotting different processing to touch operations (for example, the tap operation, the peek operation, the pop operation) having different pressing forces. The 3D touch processing is processing of displaying a variety of information and receiving a variety of operations in accordance with a type of the touch operation on an icon. The 3D touch processing is described in detail with reference to FIG. 5.

First, the terminal program 65 transmits the transmission request information to the complex machine 10, which is the designated apparatus, through the communication interface 55, and receives the status information transmitted from the complex machine 10 as a response to the transmission request information, through the communication interface 55 (S41). Then, the terminal program 65 displays a condition notification screen shown in FIG. 8B on the display 53 (S42). In the illustrative embodiment, the condition notification screen is a pop-up window to be displayed with being superimposed on the data selection screen. The processing of S41 is one example of a reception processing, and the processing of S42 is one example of a second display processing. The terminal program 65 receives a user operation on the condition notification screen, through the operation interface 54 (S43).

The condition notification screen is a screen for notifying execution conditions of the print operation indicated by the condition information stored in the area 62B. Also, the terminal program 65 associates and displays, on the condition notification screen, a [x] image 141 with an execution condition (hereinafter, referred to as "inhibitory condition"), with which the execution of the print operation is to be inhibited at a status indicated by the status information received in S41, of the plurality of execution conditions indicated by the condition information stored in the area 62B. In the meantime, when there is no inhibitory condition, the [x] image 141 is not displayed on the condition notification screen.

As an example, when the remaining amount of cyan ink indicated by the ink information included in the status information is less than a threshold (for example, 10%), the terminal program 65 determines that the color information "color" is the inhibitory condition, and associates and displays the [x] image 141 with the inhibitory condition, as shown in FIG. 8B. This also applies to a case where the remaining amount of magenta ink or yellow ink is less than the threshold. As another example, when the remaining amount of sheets in the tray 1 indicated by the sheet information included in the status information is 0%, the terminal program 65 determines that the tray information "tray 1" is the inhibitory condition.

The display of the [x] image 141 is one example of an explicit display of the inhibitory condition. However, the specific method of explicitly showing the inhibitory condition is not limited thereto. As an example, the terminal program 65 may be configured to highlight the inhibitory condition. As another example, the terminal program 65 may be configured to display the inhibitory condition above another execution condition on the condition notification screen. As another example, the terminal program 65 may be configured to display only the inhibitory condition on the condition notification screen and to set the execution conditions other than the inhibitory condition to a non-display.

Figure 9A:
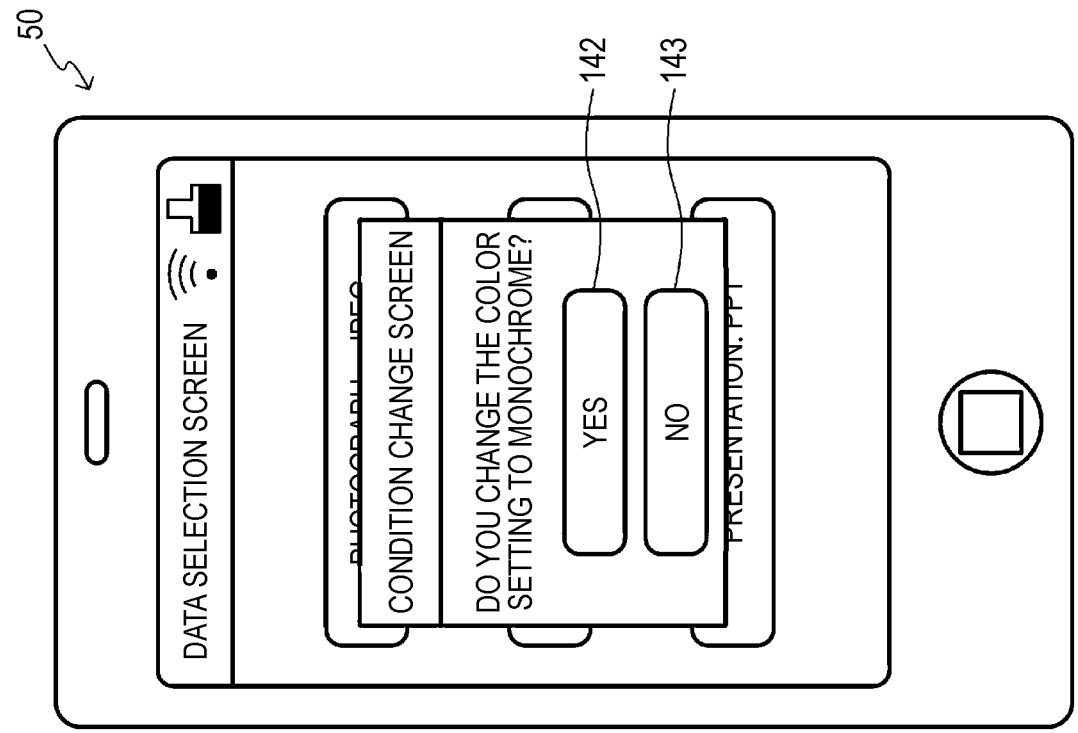

Then, when the operation interface 54 detects that the peek operation detected in S22 has changed to the slide operation (S43: slide), the terminal program 65 displays a condition change screen shown in FIG. 9A on the display 53, instead of the condition notification screen (S44). In the illustrative embodiment, the condition change screen is a pop-up window to be displayed with being superimposed on the data selection screen. The processing of S44 is one example of a fourth display processing. In the meantime, when the position indicated by the position signal output from the position sensor 54B continuously changes at a state where the second pressure signal is output from the pressure sensor 54A, the operation interface 54 detects that the peek operation has changed to the slide operation. Then, the terminal program 65 receives a user operation on the condition change screen, through the operation interface 54 (S45).

The condition change screen is a screen for prompting the user to change the inhibitory condition. The condition change screen shown in FIG. 9A includes a message "Do you change the color setting to monochrome?", and a [YES] icon 142 and a [NO] icon 143. That is, the condition change screen shown in FIG. 9A is a screen for prompting the user to change the color information of the condition information stored in the area 62B from "color" to "monochrome". In the meantime, the contents to be displayed on the condition change screen are different depending on which execution condition is to be the inhibitory condition.

Then, when the operation interface 54 detects a tap operation on a position of the [YES] icon 142 (S45: Yes), the terminal program 65 updates the condition information stored in the area 62B with the contents prompted through the condition change screen (S46). That is, in the illustrative embodiment, the terminal program 65 changes the color information of the condition information stored in the area 62B from "color" to "monochrome". The tap operation on the [YES] icon 142 is one example of a touch operation to instruct the change of the execution condition. On the other hand, when the operation interface 54 detects a tap operation on a position of the [NO] icon 143 (S45: No), the terminal program 65 skips over the processing of S46.

Then, the terminal program 65 determines whether the designated apparatus at the status indicated by the status information received in S41 can execute the print operation in accordance with the execution conditions indicated by the condition information stored in the area 62B (S47). In the meantime, when the execution condition is changed in S46, the terminal program 65 determines whether the designated apparatus can execute the print operation in accordance with the changed execution condition. The processing of S47 is one example of a first determination processing.

The terminal program 65 may be configured to determine in step S47 whether the status information is received in S41, whether the remaining amount of ink indicated by the ink information included in the received status information is equal to or greater than the threshold, whether the remaining amount of sheets indicated by the sheet information included in the received status information is greater than 0%, and the like. Also, when the color information stored in the area 62B is "monochrome", the terminal program 65 may compare only the remaining amount of black ink with the threshold, and when the color information is "color", the terminal program 65 may compare the remaining amounts of inks of all colors with the threshold.

When all the above-described conditions are satisfied, the terminal program 65 determines that the designated apparatus can execute the print operation (S47: Yes). Then, the terminal program 65 sets a first value "ON" for the continuation flag (S48), and ends the 3D touch processing. On the other hand, when at least one of the above-described conditions is not satisfied, the terminal program 65 determines that the designated apparatus cannot execute the print operation (S47: No). Then, the terminal program 65 sets a second value "OFF" for the continuation flag (S49), and ends the 3D touch processing.

In the meantime, when the operation interface 54 detects that the peek operation detected in S22 has changed to the pop operation (S43: pop), the terminal program 65 executes the processing of S47 and thereafter without executing the processing of S44 to S46. Also, even when the slide operation is performed at a state where there is no inhibitory condition, the terminal program may skip over the processing of S44 to S46. Also, when the operation interface 54 detects that the input medium separates from the display surface during the peek operation (S43: separation), the terminal program 65 executes the processing of S49 without executing the processing of S44 to S48.

Then, returning to FIG. 4A, the terminal program 65 determines the setting value of the continuation flag (S24). When it is determined that the first value "ON" is set for the continuation flag (S24: ON), the terminal program 65 decides data "presentation.PPT" corresponding to the data icon 133 at the position at which the peek operation has been detected, as the designated data (S25). That is, the terminal program 65 temporarily stores a data ID of the data "presentation.PPT" associated with the data icon 133 in the area 62B, as the designated data ID. The processing of S25 is one example of a decision processing.

On the other hand, when it is determined that the second value "OFF" is set for the continuation flag (S24: OFF), the terminal program 65 re-executes the processing of S21 and thereafter. That is, the terminal program 65 sets the screen displayed in S42, S44 to a non-display, and displays the data selection screen on the display 53 without proceeding to the processing of S25 and thereafter. At this time, the terminal program 65 may display a message "It is not possible to perform the print operation for the designated data" and the like on the display 53. Also, when the operation interface 54 detects a tap operation on a position of the data icon 133 (S22: tap), the terminal program 65 executes the processing of S25 without executing the processing of 23 and S24.

Then, returning to FIG. 3, the terminal program 65 executes preview processing (S16). The preview processing is processing of enabling the user to check an image of an execution result of the print operation for the designated data. The preview processing is described in detail with reference to FIG. 4B.

Figure 9B:
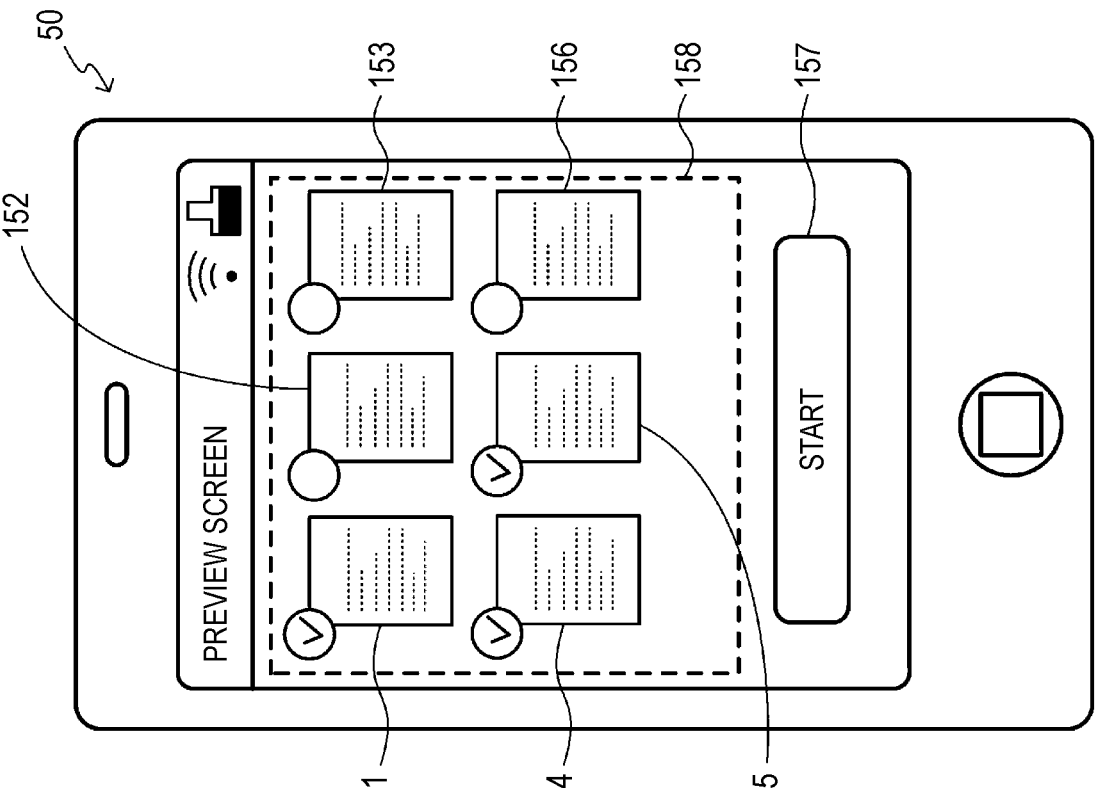

First, the terminal program 65 displays a preview screen shown in FIG. 9B on the display 53 (S31). The processing of S31 is one example of a first display processing. The preview screen includes preview images 151, 152, 153, 154, 155, 156, and a [start] icon 157. Also, a preview area 158 shown with the dotted line in FIG. 9B includes the preview images 151 to 156 and a background area in which the preview image is not displayed. Then, the terminal program 65 receives a user operation on the preview screen, through the operation interface 54 (S32).

The preview images 151 to 156 are examples of the data object corresponding to one page data included in the designated data. The [start] icon 157 is one example of an execution instruction object corresponding to an instruction to enable the designated apparatus to execute a designated operation for the designated data in accordance with the execution conditions. Also, a check box added to a left-upper corner of each of the preview images 151 to 156 indicates whether to set the page data corresponding to each of the preview images 151 to 156, as a target of the print operation.

That is, in the example of FIG. 9B, the page data corresponding to the preview images 151, 154, 155 becomes a target of the print operation, and the page data corresponding to the preview images 152, 153, 156 is not the target of the print operation. In other words, the page data corresponding to the checked preview images 151, 154, 155 is the designated data. The check boxes associated with the preview images 151 to 156 are checked or check-released by a pop operation or the like on positions of the preview images 151 to 156, as described later.

Then, when the operation interface 54 detects a peek operation on the preview area 158 (S32: peek on preview area), the terminal program 65 executes condition change processing (S36). The condition change processing is processing of causing the user to conform the condition information stored in the area 62B and changing the condition information in accordance with a user's instruction. The condition change processing is described in detail with reference to FIG. 6.

Figure 10A:
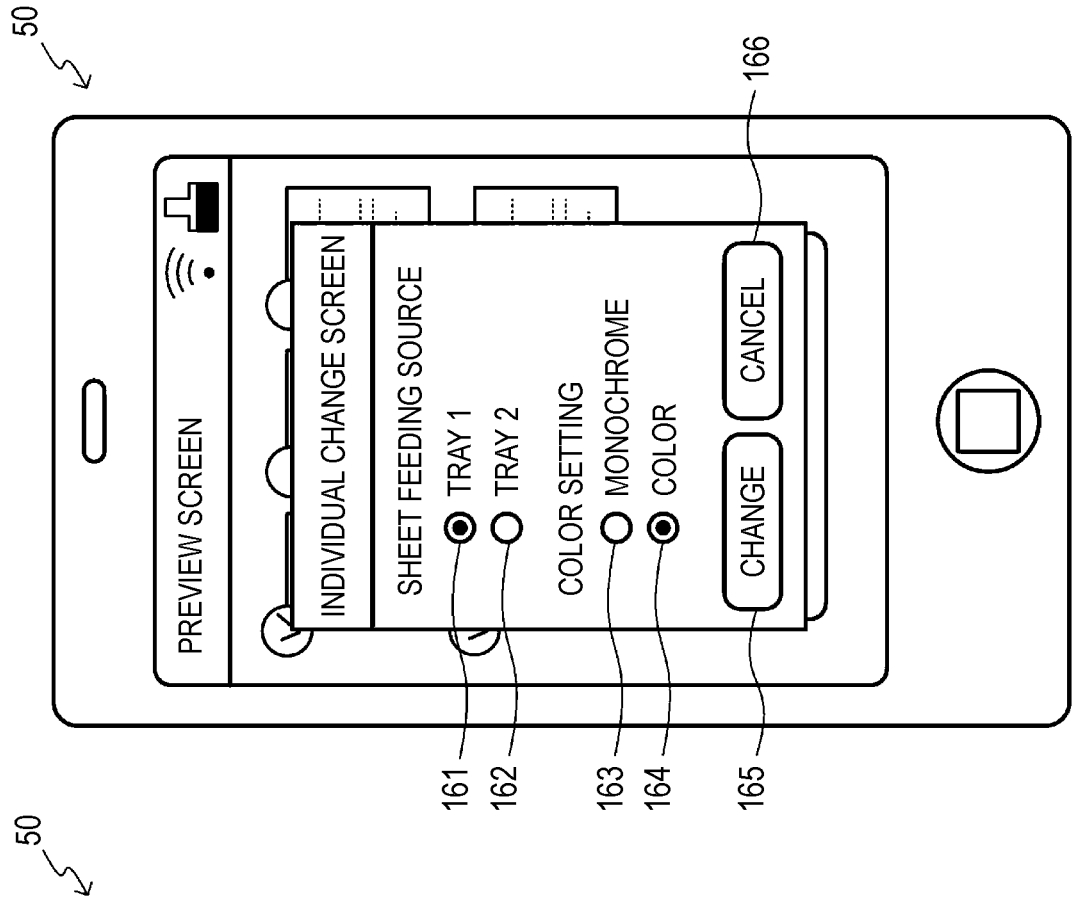

When the peek operation detected in S32 is performed on the position of the preview image 152 (S51: preview image), the terminal program 65 displays an individual notification screen shown in FIG. 10A on the display 53 (S52). In the illustrative embodiment, the individual notification screen is a pop-up window to be displayed with being superimposed on the preview screen. The individual notification screen is a screen for notifying execution conditions inherent to the page data corresponding to the preview image 152. The individual notification screen shown in FIG. 10A displays the tray information "tray 1" and the color information "color" and does not display the recording surface information and the layout information. The processing of S52 is one example of a fifth display processing and a second display processing. Then, the terminal program 65 receives a user operation on the individual notification screen, through the operation interface 54 (S53).

In the meantime, the description "execution condition inherent to page data" indicates an execution condition that is to be applied to only one of the plurality of page data, for example. That is, the tray information and the color information can be set with different values with respect to each of the plurality of page data included in the designated data. However, before the processing of S52 is executed, all the page data is associated with the common tray information and color information, as shown in FIG. 2B, for example. In the meantime, the recording surface information and the layout information are set with values common to all the page data included in the designated data, as shown in FIGS. 2B and 2C, for example.

Figure 10B:
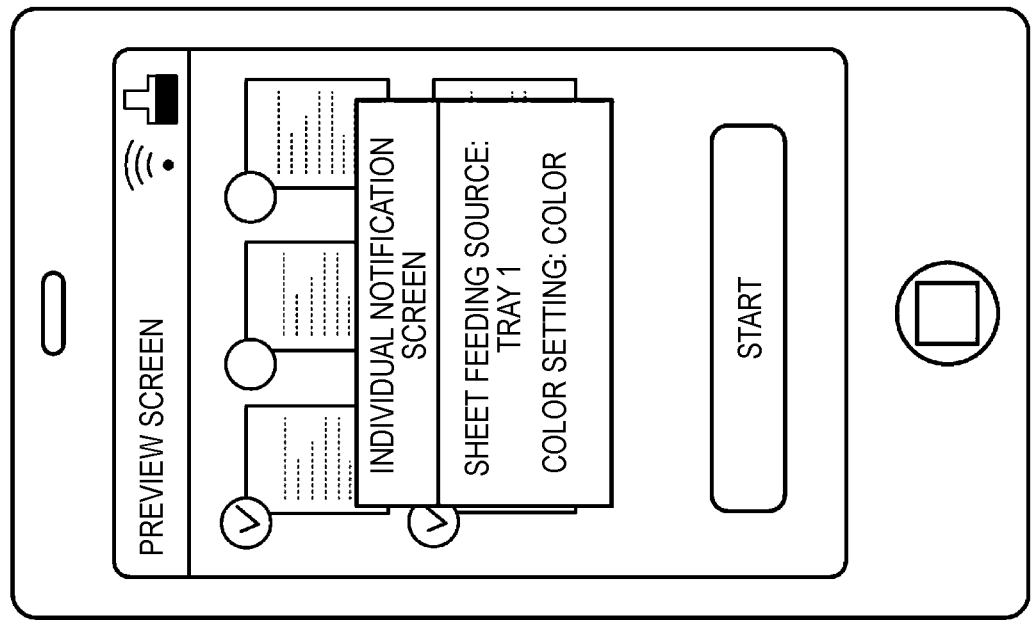

Then, when the operation interface 54 detects that the peek operation detected in S32 has changed to the slide operation (S53: slide), the terminal program 65 displays an individual change screen shown in FIG. 10B on the display 53, instead of the individual notification screen (S54). The processing of step S54 is one example of the third display processing. In the illustrative embodiment, the individual change screen is a pop-up window to be displayed with being superimposed on the preview screen. The individual change screen is a screen for prompting the user to change the execution conditions inherent to the page data corresponding to the preview image 152. Then, the terminal program 65 receives a user operation on the individual change screen, through the operation interface 54 (S55).

The individual change screen shown in FIG. 10B includes radio buttons 161, 162, 163, 164, a [change] icon 165, and a [cancel] icon 166. The radio buttons 161, 162 correspond to one of the execution conditions "tray 1" and "tray 2" set in the tray information, and the radio buttons 163, 164 correspond to one of the execution conditions "monochrome" and "color" set in the color information. The [change] icon 165 corresponds to an instruction to change the execution conditions inherent to the page data. The [cancel] icon 166 corresponds to an instruction not to change the execution conditions.

Then, when the operation interface 54 detects a tap operation on a position of the [change] icon 165 (S55: Yes), the terminal program 65 includes the execution conditions corresponding to the checked radio buttons 161 to 164 in the condition information stored in the area 62B, as the execution conditions inherent to the page data corresponding to the preview image 152 (S56). The processing of step S56 is one example of the first storing processing.

For example, when the radio buttons 161, 163 are checked, the terminal program 65 updates the condition information shown in FIG. 2B, as shown in FIG. 2C. In the condition information shown in FIG. 2C, the color information "monochrome" is associated with the page data "page 2" corresponding to the preview image 152, and the color information "color" is associated with the other page data "pages 1, 4, 5". In the meantime, the tray information, the recording surface information and the layout information are respectively set with the same value with respect to all the page data.

[JP0072]

Then, the terminal program 65 includes the page data corresponding to the preview image 152 in the target of the print operation or excludes the same from the target of the print operation (S57). More specifically, when the peek operation on the position of the preview image 152, which has not been checked, is detected in S32, S51, the terminal program 65 includes the page data corresponding to the preview image 152 in the target of the print operation or excludes the same from the target of the print operation. On the other hand, when the peek operation on the position of the checked preview image 151 is detected in S32, S51, the terminal program 65 excludes the page data corresponding to the preview image 151 from the target of the print operation or includes the same in the target of the print operation. The processing of S57 is one example of a decision processing.

For example, when the operation interface 54 detects a tap operation on a position of the [change] icon 165 (S55: Yes), the terminal program 65 executes the processing of S56 and then includes the page data corresponding to the preview image in the target of the print operation regardless of whether said the preview image has been checked or not. On the other hand, when the operation interface 54 detects a tap operation on a position of the [cancel] icon 166 (S55: No), the terminal program 65 executes the processing of S57 without executing the processing of S56 to exclude the page data corresponding to the preview image 152, which has not been checked, from the target of the print operation or includes the page data corresponding to the preview image 151, which has been checked, in the target of the print operation. Also, when the operation interface 54 detects that the peek operation detected in S32 has changed to the pop operation (S53: pop), the terminal program 65 executes the processing of S57 without executing the processing of S54 to S56. In the processing of S57, when the pop operation has been performed on the position of the preview image 151, which had been checked, the terminal program 65 excludes the page data corresponding to the preview image 151 from the target of the print operation, and when the pop operation has been performed on the position of the preview image 152, which had been checked, the terminal program 65 includes the page data corresponding to the preview image 152 in the target of the print operation.

Figure 11A:
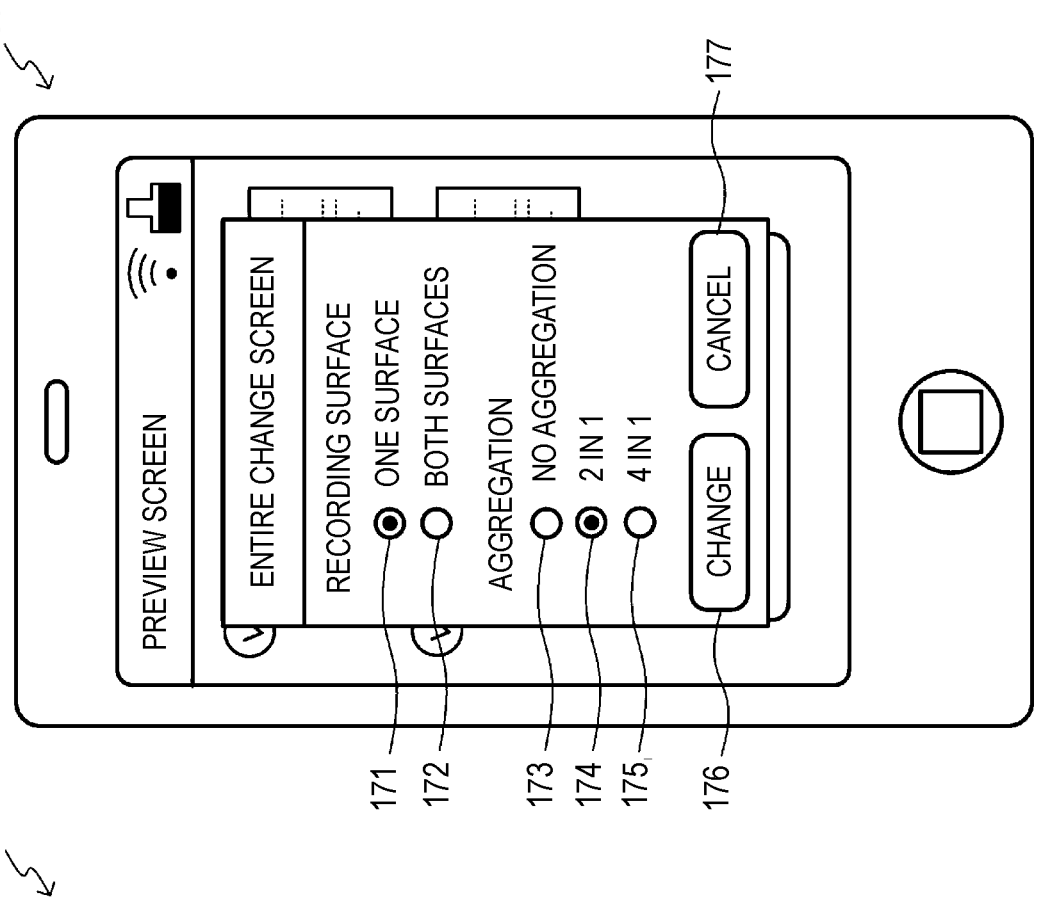

Also, when the peek operation detected in S32 is performed in the background area (S51: background area), the terminal program 65 displays an entire notification screen shown in FIG. 11A on the display 53 (S58). In the illustrative embodiment, the entire notification screen is a pop-up window to be displayed with being superimposed on the preview screen. The entire notification screen is a screen for notifying the execution conditions common to all the page data. The entire notification screen shown in FIG. 11A displays the recording surface information "one surface" and the layout information "2in1", and does not display the tray information and the color information. Then, the terminal program 65 receives a user operation on the entire notification screen, through the operation interface 54 (S59).

Figure 11B:
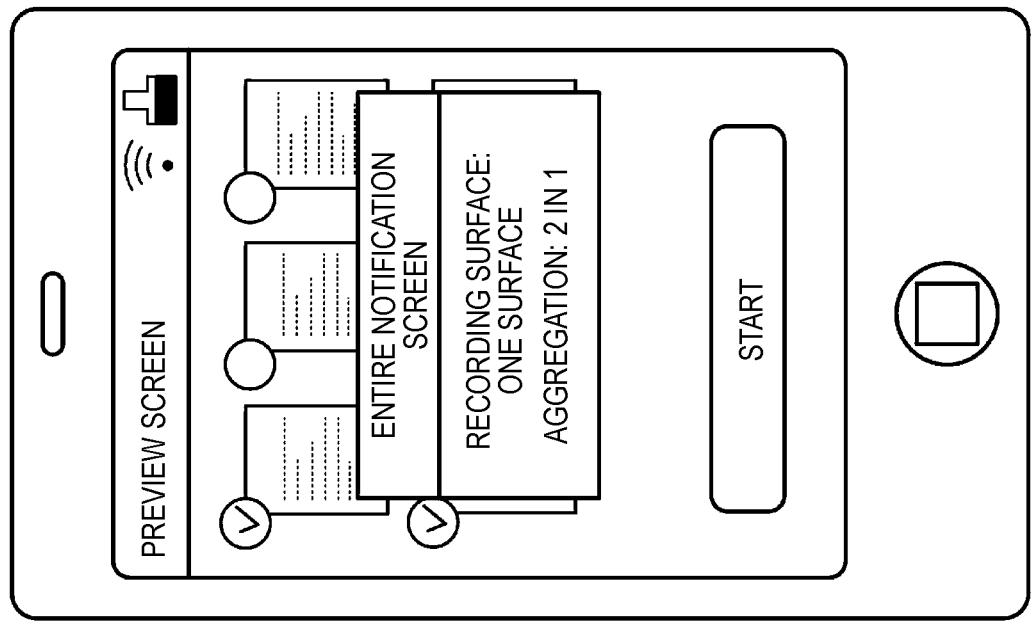

Then, when the operation interface 54 detects that the peek operation detected in S32 has changed to the slide operation (S59: slide), the terminal program 65 displays an entire change screen shown in FIG. 11B on the display 53, instead of the entire notification screen (S60). The processing of step S60 is one example of a fourth display processing. In the illustrative embodiment, the entire change screen is a pop-up window to be displayed with being superimposed on the preview screen. The entire change screen is a screen for prompting the user to change the execution conditions common to all the page data. Then, the terminal program 65 receives a user operation on the entire change screen, through the operation interface 54 (S61).

The entire change screen shown in FIG. 11B includes radio buttons 171, 172, 173, 174, 175, a [change] icon 176 and a [cancel] icon 177. The radio buttons 171, 172 correspond to one of the execution conditions "one surface" and "both surfaces" set in the recording surface information, and the radio buttons 173 to 175 correspond to one of the execution conditions "no aggregation", "2in1" and "4in1" set in the layout information. The [change] icon 176 corresponds to an instruction to change the execution conditions common to the page data. The [cancel] icon 177 corresponds to an instruction not to change the execution conditions.

Then, when the operation interface 54 detects a tap operation on a position of the [change] icon 176 (S61: Yes), the terminal program 65 stores the execution conditions corresponding to the checked radio buttons 171 to 165 in the area 62B, as the execution conditions common to all the page data (S62). For example, when the radio buttons 171, 173 are checked, the terminal program 65 overwrites the layout information of the condition information shown in FIG. 2B from "2in1" to "no aggregation". The processing of step S62 is one example of the second storing processing.

On the other hand, when the operation interface 54 detects a tap operation on a position of the [cancel] icon 177 (S61: No), the terminal program 65 ends the condition change processing without executing the processing of S62. When the operation interface 54 detects that the input medium separates from the display surface during the peek operation (S53 or S59: separation), the terminal program 65 ends the condition change processing without executing the processing of S54 to S57 or S60 to S62.

Then, returning to FIG. 4B, the terminal program 65 re-executes the processing of S31 and thereafter. The preview screen displayed here is different from the preview screen shown in FIG. 9B, in that the check box corresponding to the preview image 152 is checked. In the meantime, when the page data is excluded from the target of the print operation in S57, the checked status of the check box of the preview image corresponding to the page data is released.

Then, when the operation interface 54 detects a peek operation on a position of the [start] icon 157 (S32: start icon & S33: peek), the terminal program 65 executes the 3D touch processing (S34). The 3D touch processing to be executed in S34 is common to the processing of S23 but a screen to be displayed on the display 53 is different. In the below, the detailed descriptions common to the processing of S23 are omitted, and differences are mainly described.

Figure 12A:
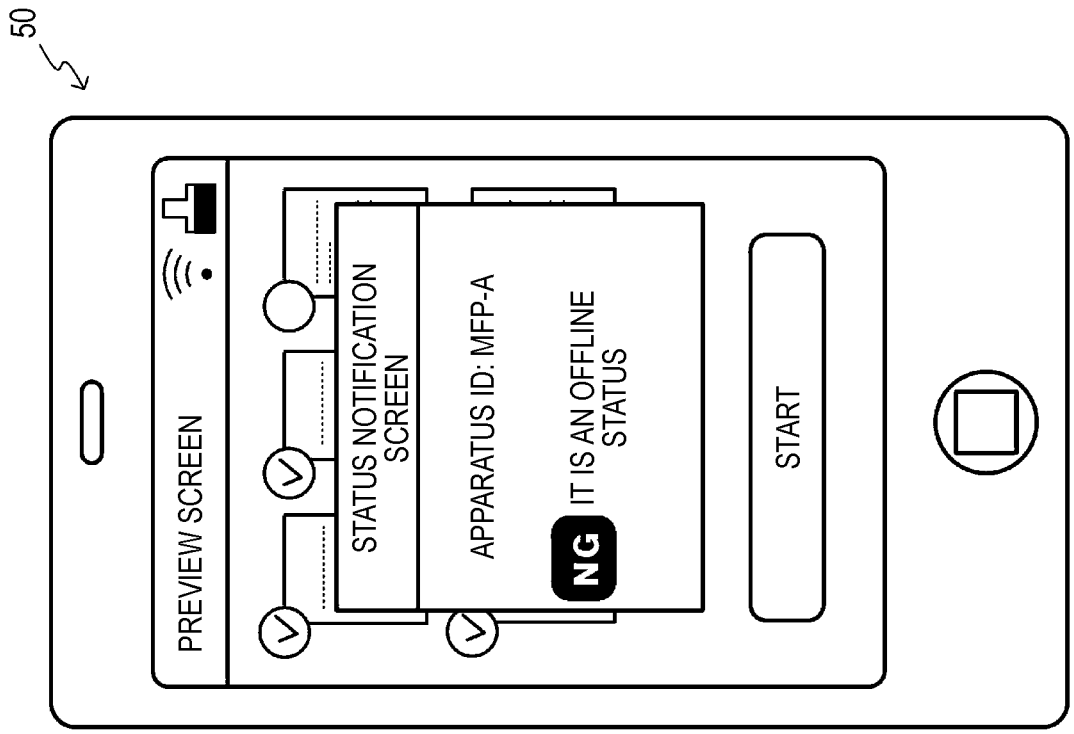
Figure 12B:
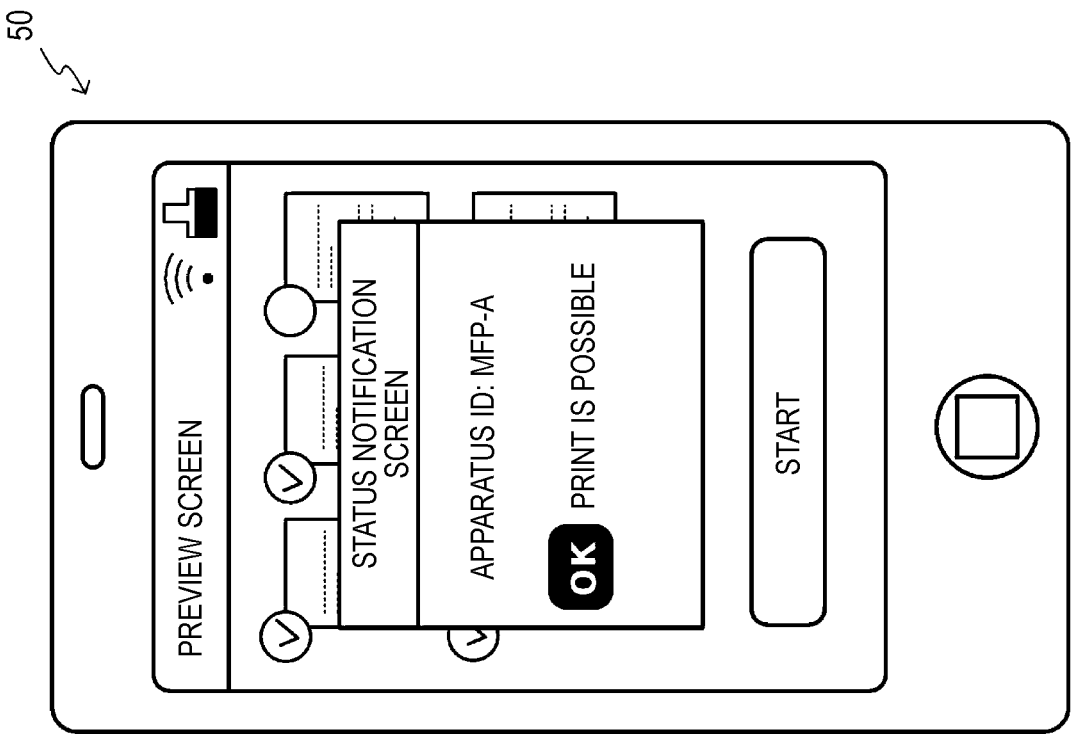

In the 3D touch processing to be executed in S34, the terminal program 65 displays a status notification screen shown in FIGS. 12A and 12B on the display 53 (S42). In the illustrative embodiment, the status notification screen is a pop-up window to be displayed with being superimposed on the preview screen. The status notification screen is a screen for notifying a status of the complex machine 10 indicated by the status information received in S41. Then, the terminal program 65 receives a user operation on the status notification screen, through the operation interface 54 (S43).

[JP0082]

The status notification screen shown in FIG. 12A includes the designated apparatus ID "MFP-A" and a message "[OK] print is possible." The status screen shown in FIG. 12A indicates that the complex machine 10, which is the designated apparatus, at a state where it can execute the print operation. For example, when the status information is received in S41, the remaining amount of ink indicated by the ink information is equal to or greater than the threshold and the remaining amount of sheets indicated by the sheet information is equal to or greater than the threshold, the terminal program 65 displays the status notification screen shown in FIG. 12A. When the operation interface 54 detects that the peek operation detected in S33 has changed to the pop operation (S43: pop), the terminal program 65 executes the processing of S17. On the other hand, when the operation interface 54 detects that the input medium separates from the display surface during the peek operation (S43: separation), the terminal program 65 executes the processing of S49 without executing the processing of S44 to S48.

On the other hand, the status notification screen shown in FIG. 12B includes the designated apparatus ID "MFP-A" and a message "[NG] It is an offline status". The status screen shown in FIG. 12B indicates that it is not possible to perform communication with the complex machine 10. For example, when the status information cannot be received even though a threshold time period has elapsed after transmitting the transmission request information in S41, the terminal program 65 displays the status notification screen shown in FIG. 12B. FIG. 12B depicts one example of a status notification screen of explicitly showing the item "communication status", which inhibits the execution of the print operation, of the plurality of items indicated by the status information.

Then, when the operation interface 54 detects that the peek operation detected in S33 has changed to the slide operation (S43: slide), the terminal program 65 displays a device change screen shown in FIG. 13A on the display 53, instead of the status notification screen shown in FIG. 12B (S44). In the illustrative embodiment, the device change screen is a pop-up window to be displayed with being superimposed on the preview screen. Then, the terminal program 65 receives a user operation on the device change screen, through the operation interface 54 (S45).

The device change screen is a screen for prompting the user to designate an image processing apparatus, which is to be enabled to execute the print operation, of the image processing apparatuses capable of performing communication through the communication interface 55. The device change screen shown in FIG. 13A includes device icons 181, 182 corresponding to image processing apparatuses "MFP-B", "MFP-C" (not shown) connected to the communication network 101.

Then, when the operation interface 54 detects a tap operation on a position of the device icon 181 (S45: Yes), for example, the terminal program 65 overwrites the designated apparatus ID "MFP-A" stored in the area 62B with the apparatus ID "MFP-B" associated with the designated device icon 181 (S46). The tap operation on the positions of the device icons 181, 182 is one example of a touch operation to designate the designated apparatus. Then, the terminal program 65 determines whether the new designated apparatus can execute the print operation (S47). That is, the terminal program 65 receives the status information from the new designated apparatus through the communication interface 55, and executes the processing of S47 on the basis of the received status information.

As another example, when the status information is received in S41 and the remaining amount of cyan ink indicated by the ink information is less than the threshold, the terminal program 65 may display the status notification screen including a message "cyan ink is at a low state" on the display 53 (S42). Then, when the operation interface 54 detects that the peek operation detected in S33 has changed to the slide operation (S43: slide), the terminal program 65 may display the condition change screen shown in FIG. 9A on the display 53, instead of the status notification screen (S44).

Alternatively, when the operation interface 54 detects that the peek operation detected in S33 has changed to the slide operation (S43: slide), the terminal program 65 may display a help screen shown in FIG. 13B on the display 53, instead of the status notification screen. This processing is one example of a third display processing. The help screen is a screen for displaying a sequence for enabling the image processing apparatus to execute the print operation. In the illustrative embodiment, the help screen includes a message "Please, replace the cartridge of cyan ink./Cartridge ID: C-001" and a [OK] icon 183. When the operation interface 54 detects a tap operation on a position of the [OK] icon 183, the terminal program 65 may receive the status information from the designated apparatus and execute the processing of S47 on the basis of the received status information.

Again returning to FIG. 4B, when it is determined that the first value "ON" is set for the continuation flag (S35: ON), the terminal program 65 ends the preview processing. Also, when the operation interface 54 detects a tap operation on the position of the [start] icon 157 (S32: start icon & S33: tap), the terminal program 65 ends the preview processing without executing the processing of S34 and S35.

On the other hand, when it is determined that the second value "OFF" is set for the continuation flag (S35: OFF), the terminal program 65 re-executes the processing of S31 and thereafter. That is, the terminal program 65 sets the screen displayed in S42, S44 to a non-display, and displays the preview screen on the display 53 without proceeding to the processing of S17. At this time, the terminal program 65 may display a message "The designated apparatus cannot execute the print operation." and the like on the display 53. Alternatively, when it is determined that the second value "OFF" is set for the continuation flag (S35: OFF), the terminal program 65 may display a setting screen for receiving a change of the execution condition on the display 53 and reflect the change of the execution condition received through the operation interface 54 into the condition information stored in the area 62B.

Again returning to FIG. 3, the terminal program 65 transmits print instruction information to the designated apparatus, through the communication interface 55 (S17). The print instruction information is information for instructing to execute the print operation for the designated data in accordance with the execution conditions indicated by the condition information. The print instruction information includes the designated data designated in S25, S57 and the condition information stored in the area 62B, for example. In the meantime, when any one processing of S46, S56 and S62 is executed, the terminal program 65 includes the changed condition information in the print instruction information. The processing of S17 is one example of an execution instruction processing.

In the meantime, although not shown, the apparatus program 35 of the complex machine 10 receives the print instruction information from the terminal apparatus 50, through the communication interface 25. Then, the apparatus program 35 enables the printer 11 to execute the print operation in accordance with the received print instruction information. That is, the printer 11 records an image, which is expressed by the designated data included in the print instruction information, on the sheet in accordance with the execution conditions indicated by the condition information included in the print instruction information.

According to the illustrative embodiment, when the status information is received through the peek operation on the [start] icon 157 and the peek operation changes to the pop operation, it is determined whether the print operation is to be executed. Also, the status of the designated apparatus is notified to the user of the terminal apparatus 50 through the status notification screen, too. Then, when it is determined that the print operation can be executed, the print instruction information is transmitted to the designated apparatus. That is, the user of the terminal apparatus 50 can instruct the execution of the print operation after checking the status of the designated apparatus by the simple operation of sequentially performing the peek operation and the pop operation on the [start] icon 157.

Also, according to the illustrative embodiment, the notification screen is displayed by the peek operation on the data object or the preview image, and the peek operation changes to the pop operation, so that the corresponding data is decided as the designated data. That is, the user of the terminal apparatus 50 can designate the designated data after checking the execution conditions by the simple operation of sequentially performing the peek operation and the pop operation.

Also, according to the illustrative embodiment, the execution conditions inherent to the corresponding page data are changed by the peek operation and the slide operation on the preview image. In the meantime, the execution conditions common to all the page data are changed by the peek operation and the slide operation on the background area. Thereby, the user of the terminal apparatus 50 can set the appropriate execution conditions for each page data by the simple operation.

In the meantime, the pop-up windows to be displayed by the peek operation and the slide operation are not limited to the screens shown in FIGS. 8 to 13. In the below, the processing of the terminal program 65 in accordance with modified embodiments is described. The detailed descriptions of the common points to the illustrative embodiment are omitted and differences are mainly described.

First Modified Embodiment

In a first modified embodiment, when the operation interface 54 detects the peek operation on the position of the [start] icon 157 (S32: start icon & S33: peek), the terminal program 65 may display the condition notification screen shown in FIG. 8B on the display 53 (S42). In the first modified embodiment, when the operation interface 54 detects that the peek operation detected in S33 has changed to the pop operation (S43: pop), the terminal program 65 executes the processing of S17. The processing of S17 is one example of an association processing associated with the [start] icon 157.

That is, when the execution conditions of the association processing are notified by the peek operation on the position of the [start] icon 157 and the peek operation changes to the pop operation, the association processing (S17) is executed. Thereby, the user of the terminal apparatus 50 can instruct the execution of the association processing after checking the execution conditions by the simple operation of sequentially performing the peek operation and the pop operation on the [start] icon 157.

Also, in the first modified embodiment, when the operation interface 54 detects that the peek operation detected in S33 has changed to the slide operation (S43: slide), the terminal program 65 may display the condition change screen shown in FIG. 9A on the display 53, instead of the condition notification screen shown in FIG. 8B (S44). That is, the user of the terminal apparatus 50 can change the execution conditions of the association processing by the peek operation and the slide operation on the [start] icon 157.

Also, the relation between the association processing and the execution condition is not limited to the above example. As an example, when execution conditions of the scan operation are notified by the peek operation on a [scan] icon for instructing execution of the scan operation and the peek operation changes to the pop operation, the designated apparatus may be instructed to execute the scan operation. As another example, when execution conditions of the FAX transmission operation are notified by the peek operation on a [FAX transmission] icon for instructing execution of the FAX transmission operation and the peek operation changes to the pop operation, the designated apparatus may be instructed to execute the FAX transmission operation.

Also, the association processing is not limited to the processing of enabling the image processing apparatus to execute an operation. For example, the terminal apparatus 50 may further have a camera. When the operation interface 54 detects a peek operation on a position of a [shutter] icon, the terminal program 65 may report photographing conditions through the condition notification screen. Also, when the operation interface 54 detects that the peek operation on the [shutter] icon has changed to the pop operation, the terminal program 65 may execute the association processing of enabling the camera to image a subject for photography. In the meantime, the photographing conditions include a resolution, a white balance, whether or not a flash, and the like.

Second Modified Embodiment

The items to be displayed on the status notification screen may be different depending on an operation mode of the designated apparatus. The operation mode includes a manager mode that is made when authentication information allotted to a manager of the designated apparatus is input to the designated apparatus and a normal mode that is made when the authentication information is not input to the designated apparatus. In a second modified embodiment, when the complex machine 10 is at the manager mode, the apparatus program 35 transmits the status information including the management information to the terminal apparatus 50. On the other hand, in the second modified embodiment, when the complex machine 10 is at the normal mode, the apparatus program 35 transmits the status information, which does not include the management information, to the terminal apparatus 50.

Also, the authentication information may be input to the terminal program 65, not the designated apparatus. That is, in the second modified embodiment, the terminal program 65 may operate at the manager mode or the normal mode. The terminal program 65 operating at the manager mode transmits the transmission request information including the authentication information to the designated apparatus. On the other hand, the terminal program 65 operating at the normal mode transmits the transmission request information, which does not include the authentication information, to the designated apparatus. In the second modified embodiment, the apparatus program 35 transmits the status information including the management information to the terminal apparatus 50, as a response to the transmission request information including the authentication information. On the other hand, in the second modified embodiment, the apparatus program 35 transmits the status information, which does not include the management information, to the terminal apparatus 50, as a response to the transmission request information, which does not include the authentication information.

Also, when the status information including the management information is received, the terminal program 65 may display the management information on the status notification screen. On the other hand, when the status information, which does not include the management information, is received, the terminal program 65 may display the status notification screen shown in FIG. 12. That is, when the designated apparatus or the terminal program 65 is at the manager mode and when the designated apparatus and the terminal program 65 are not at the manager mode, the terminal program 65 makes the items to be displayed on the status notification screen different. Thereby, it is possible to appropriately notify the user of the appropriate information in accordance with the operation mode.

Other Modified Embodiments

When the operation interface 54 detects the peek operation on the positions of the data icons 131 to 133 (S22: peek→S23), the terminal program 65 may display the status notification screen shown in FIG. 12 on the display 53 (S42). Also, when the operation interface 54 detects that the peek operation has changed to the slide operation (S43: slide), in the 3D touch processing that is to be executed in S23, the terminal program 65 may display the help screen shown in FIG. 13B on the display 53, instead of the condition notification screen shown in FIG. 8B (S44).

Also, in the illustrative embodiment and each modified embodiment, the example where the pop-up window is displayed by combining the peek operation, the pop operation and the slide operation has been described. However, the combination of the touch operations is not limited to the above example. For example, the long touch operation may be detected instead of the peek operation, the separation of the input medium may be detected instead of the pop operation, and the flick operation may be detected instead of the slide operation. In this case, the pressure sensor 54A may be omitted.

Also, in the complex machine 10 and the terminal apparatus 50 of the illustrative embodiment, the diverse programs stored in the program storage areas 32A, 62A of the memories 32, 62 are executed by the CPUs 31, 61, so that each processing to be executed by the control unit of the disclosure is implemented. However, the configuration of the control unit is not limited thereto, and a part or all of the control unit may be implemented by the hardware such as an integrated circuit.

Also, the disclosure may be implemented as the complex machine 10 and the terminal apparatus 50 and as the program for enabling the complex machine 10 and the terminal apparatus 50 to execute the processing. The program may be provided with being recorded in a non-transitory recording medium. The non-transitory recording medium may include a memory mounted to a server, which can be connected to the complex machine 10 and the terminal apparatus 50 through the communication network 101, in addition to a CD-ROM, a DVD-ROM and the like. Also, the program stored in the memory of the server may be delivered through the communication network 101 such as the Internet, as the information or signal indicative of the program.

What is claimed is:

1. A non-transitory computer-readable medium having a computer program stored thereon and readable by a computer of a terminal apparatus, the terminal apparatus comprising a display having a display surface, a touch sensor arranged with being superimposed on the display surface and including a pressure sensor configured to detect a pressure to be applied by an input medium and a position sensor configured to detect a position at which a pressure is to be applied by the input medium, and configured to detect a touch operation, and a communication interface, the computer program, when executed by the computer, causing the terminal apparatus to perform:

displaying an execution instruction object on the display surface;

receiving an operation by the input medium;

a first process in response to the touch sensor detecting from the received operation that a first operation is executed on a position of the execution instruction object, the detection of the first operation being based on the pressure sensor detecting a pressure less than a threshold and the position sensor detecting the position, the first process comprising:

receiving status information from an image processing apparatus through the communication interface, the status information being information indicative of a status of the image processing apparatus; and a second process in response to the touch sensor detecting from the received operation that the first operation on the position of the execution instruction object has continuously changed to a second operation executed on the position where the first operation has been executed, the detection of the second operation being based on the pressure sensor detecting a pressure equal to or greater than the threshold and the position sensor detecting the position, the second process being a different type of process from the first process and comprising:

determining whether the image processing apparatus can execute an operation for image data on the basis of the received status information, the operation for image data comprising a printing operation performed by the image processing apparatus; and transmitting execution instruction information for instructing execution of the operation to the image processing apparatus through the communication interface in response to it being determined that the operation can be executed, wherein the computer program, when executed by the computer, causes the terminal apparatus to perform the transmitting of the execution instruction without performing the receiving of the status information and the determining of whether the image processing apparatus can execute the operation for the image data in response to the touch sensor detecting that a third operation on a position of the execution instruction object is executed, the third operation being executed instead of the first operation.

2. The non-transitory computer-readable medium according to claim 1, wherein the computer program, when executed by the computer, causes the terminal apparatus to perform:

displaying the status of the image processing apparatus indicated by the received status information on the display surface.

3. The non-transitory computer-readable medium according to claim 2, wherein in the displaying of the status of the image processing apparatus, the computer program, when executed by the computer, causes the terminal apparatus to explicitly show an item, which inhibits the execution of the operation, of a plurality of items indicated by the status information.

4. The non-transitory computer-readable medium according to claim 3, wherein the terminal apparatus comprises a memory, and
wherein the computer program, when executed by the computer, causes the terminal apparatus to perform:
displaying a sequence for enabling the image processing apparatus to execute the operation on the display surface in response to the touch sensor detecting that the first operation on the position of the execution instruction object has changed to a fourth operation.

5. The non-transitory computer-readable medium according to claim 2, wherein the computer program, when executed by the computer, causes the terminal apparatus to make items to be displayed different in the displaying of the status of the image processing apparatus when the computer program or the image processing apparatus is at a manager mode and when the computer program and the image processing apparatus are not at the manager mode.

6. The non-transitory computer-readable medium according to claim 1, wherein the terminal apparatus comprises a memory,
wherein the computer program, when executed by the computer, causes the terminal apparatus to perform:
displaying a screen for prompting a user to change an execution condition indicated by condition information stored in the memory on the display surface in response to the touch sensor detecting that the first operation on the position of the execution instruction object has changed to a fourth operation,
wherein in response to the touch sensor detecting that a touch operation of instructing a change of the displayed execution condition is executed, the computer program causes the terminal apparatus to determine whether the operation can be executed in accordance with the changed execution condition, and
wherein in the transmitting of the execution instruction that is to be executed when it is determined that the operation can be executed, the computer program causes the terminal apparatus to transmit the execution instruction information for instructing execution of the operation in accordance with the changed execution condition.

7. The non-transitory computer-readable medium according to claim 6, wherein in the displaying of the execution condition, the computer program causes the terminal apparatus to display the screen for prompting the user to change the execution condition, which inhibits the execution of the operation at a status indicated by the status information, of a plurality of execution conditions indicated by the condition information.

8. The non-transitory computer-readable medium according to claim 7, wherein in the displaying of the execution condition that is to be executed when the status information is unable to be received in the receiving of the status information, the computer program causes the terminal apparatus to display a screen for prompting the user to designate the image processing apparatus, which is to be enabled to execute the operation, of the image processing apparatuses capable of performing communication through the communication interface,
wherein in response to the touch sensor detecting that a touch operation of designating the image processing apparatus is executed, the computer program causes the terminal apparatus to determine whether the designated image processing apparatus can execute the operation, and
wherein in the transmitting of the execution instruction that is to be executed when it is determined that the operation can be executed, the computer program causes the terminal apparatus to transmit the execution instruction information to the designated image processing apparatus.

9. The non-transitory computer-readable medium according to claim 6, wherein the computer program causes the terminal apparatus to further display a data object associated with image data, which is a target of an output operation to be executed by the image processing apparatus, in the first display processing,
wherein the computer program, when executed by the computer, causes the terminal apparatus to perform:
displaying the execution condition of the output operation on the display surface in response to the touch sensor detecting that the first operation on a position of the data object is executed; and
deciding the image data corresponding to the data object, as a target of the output operation in response to the touch sensor detecting that the first operation on the position of the data object has changed to the second operation, and
wherein in the transmitting of the execution instruction, the computer program causes the terminal apparatus to transmit the execution instruction information for instructing execution of the output operation for the decided image data.

10. The non-transitory computer-readable medium according to claim 1, wherein the computer program causes the terminal apparatus to end the displaying of the status of the image processing apparatus without performing the transmitting of the execution instruction in response to the touch sensor detecting that an input medium separates from the display surface during the first operation.

11. A non-transitory computer-readable medium having a computer program stored thereon and readable by a computer of a terminal apparatus, the terminal apparatus comprising a display having a display surface, a touch sensor arranged with being superimposed on the display surface and configured to detect a touch operation, and a communication interface, the computer program, when executed by the computer, causing the terminal apparatus to perform:
- displaying an execution instruction object on the display surface;
- receiving an operation by the input medium;
- a first process in response to the touch sensor detecting from the received operation that a first operation is executed on a position of the execution instruction object, the detection of the first operation being based on the pressure sensor detecting a pressure less than a threshold and the position sensor detecting the position, the first process comprising:
  - receiving status information from an image processing apparatus through the communication interface, the status information being information indicative of a status of the image processing apparatus; and
- a second process in response to the touch sensor detecting from the received operation that the first operation on the position of the execution instruction object has continuously changed to a second operation executed on the position where the first operation has been executed, the detection of the second operation being based on the pressure sensor detecting a pressure equal to or greater than the threshold and the position sensor detecting the position, the second process being a different type of process from the first process and comprising:
  - determining whether the image processing apparatus can execute an operation for image data on the basis of the received status information, the operation for image data comprising a printing operation performed by the image processing apparatus; and
  - transmitting execution instruction information for instructing execution of the operation to the image processing apparatus through the communication interface in response to it being determined that the operation can be executed;
- wherein the terminal apparatus comprises a memory,
- wherein the computer program, when executed by the computer, causes the terminal apparatus to perform:
  - displaying a screen for prompting a user to change an execution condition indicated by condition information stored in the memory on the display surface in response to the touch sensor detecting that the first operation on the position of the execution instruction object has changed to a third operation,
- wherein in response to the touch sensor detecting that a touch operation of instructing a change of the displayed execution condition is executed, the computer program causes the terminal apparatus to determine whether the operation can be executed in accordance with the changed execution condition,
- wherein in the transmitting of the execution instruction that is to be executed when it is determined that the operation can be executed, the computer program causes the terminal apparatus to transmit the execution instruction information for instructing execution of the operation in accordance with the changed execution condition, and
- wherein the computer program causes the terminal apparatus to perform the transmitting of the execution instruction without performing the receiving of the status information and the determining of whether the image processing apparatus can execute the operation for the image data in response to the touch sensor detecting that a fourth operation on a position of the execution instruction object is executed, the fourth operation being executed instead of the first operation;
- wherein the touch sensor comprises:
  - a pressure sensor configured to detect a pressure to be applied by an input medium; and
  - a position sensor configured to detect a position at which a pressure is to be applied by the input medium.

12. A non-transitory computer-readable medium having a program stored thereon and readable by a computer of a terminal apparatus, the terminal apparatus comprising a display having a display surface, a touch sensor arranged with being superimposed on the display surface and including a pressure sensor configured to detect a pressure to be applied by an input medium and a position sensor configured to detect a position at which a pressure is to be applied by the input medium, and configured to detect a touch operation, and a memory, the computer program, when executed by the computer, causing the terminal apparatus to perform:
- displaying an object, which is associated with association processing that the terminal apparatus is to perform, on the display surface, the association processing comprising transmitting print instruction information; and
- receiving an operation by the input medium;
- displaying an execution condition of the association processing, which is indicated by condition information stored in the memory, in response to the touch sensor detecting that a first operation is executed on a position of the object, the first operation being based on the pressure sensor detecting a pressure less than a threshold and the position sensor detecting the position,
- wherein the computer program causes the terminal apparatus to perform the association processing in accordance with the execution condition in response to the touch sensor detecting that the first operation on the position of the object has continuously changed to a second operation executed on the position where the first operation has been executed, the second operation being based on the pressure sensor detecting a pressure equal to or greater than the threshold and the position sensor detecting the position, and
- wherein the computer program causes the terminal apparatus to perform the association processing without displaying the execution condition in response to the touch sensor detecting that a third operation on a position of the execution instruction object is executed, the third operation being executed instead of the first operation.

13. The non-transitory computer-readable medium according to claim 12,
- wherein the computer program, when executed by the computer, causes the terminal apparatus to perform:
  - displaying a screen for prompting a user to change the execution condition, which inhibits execution of the operation at a status indicated by the status information, on the display surface in response to the touch sensor detecting that the first operation on the position of the object has changed to a fourth operation, and
- wherein the computer program causes the terminal apparatus to perform the association processing in accordance with the changed execution condition in response to the touch sensor detecting a touch operation of instructing a change of the execution condition.

14. A non-transitory computer-readable medium having a computer program stored thereon and readable by a terminal apparatus, the terminal apparatus comprising a display having a display surface, a touch sensor arranged with being superimposed on the display surface and configured to detect a touch operation and including a pressure sensor configured to detect a pressure to be applied by an input medium and a position sensor configured to detect a position at which a pressure is to be applied by the input medium, a memory and a communication interface, the computer program, when executed by the terminal apparatus, causing the terminal apparatus to perform:

displaying a first screen on the display surface, the first screen comprising a plurality of objects each of which is associated with image data;

receiving an operation by the input medium on the first screen;

displaying an execution condition, which is indicated by condition information stored in the memory, on the display surface in response to the touch sensor detecting that a first operation is executed on the first screen, the first operation being based on the pressure sensor detecting a pressure less than a threshold and the position sensor detecting the position;

deciding the image data corresponding to the object as designated data in response to the touch sensor detecting that the first operation on a position of the object has continuously changed to a second operation executed on the position where the first operation has been executed, the detection of the second operation being based on the pressure sensor detecting a pressure equal to or greater than the threshold and the position sensor detecting the position; and transmitting execution instruction information to an image processing apparatus through the communication interface in response to the touch sensor detecting that a touch operation of instructing an output of the designated data is executed, the execution instruction information being information for instructing an output operation of outputting the designated data in accordance with the execution condition, the output operation being one of a facsimile operation or a print operation, and wherein the computer program causes the terminal apparatus to perform the deciding without displaying the execution condition in response to the touch sensor detecting that a third operation on a position of the execution instruction object is executed, the third operation being executed instead of the first operation.

15. The non-transitory computer-readable medium according to claim 14, wherein the computer program, when executed by the computer, causes the terminal apparatus to perform receiving status information from the image processing apparatus through the communication interface in response to the touch sensor detecting the first operation, the status information being information indicative of a status of the image processing apparatus, and wherein in the displaying of the execution condition, the computer program, when executed by the computer, causes the terminal apparatus to explicitly show the execution condition, which inhibits execution of the operation at a status indicated by the status information, of a plurality of the execution conditions indicated by the condition information.

16. The non-transitory computer-readable medium according to claim 14 or 15, wherein in the displaying of the first screen, the computer program, when executed by the computer, causes the terminal apparatus to display a plurality of the objects associated with page data, which is to be respectively recorded on one sheet, wherein the computer program, when executed by the computer, causes the terminal apparatus to display the execution condition inherent to the page data associated with the object, in the displaying of the execution condition that is to be executed when the touch sensor detects the first operation on a position of the object is executed, and wherein the computer program, when executed by the computer, causes the terminal apparatus to perform:

displaying a screen for prompting a user to change the execution condition inherent to the page data associated with the object on the display surface in response to the touch sensor detecting that the first operation on the position of the object has changed to a fourth operation;

deciding the page data associated with the object as one of the designated data in response to the touch sensor detecting that a touch operation of instructing a change of the execution condition is executed; and storing the condition information indicative of the changed execution condition in the memory as the condition information inherent to the page data.

17. The non-transitory computer-readable medium according to claim 16, wherein the program is configured to display the execution condition inherent to all the page data, in the displaying of the execution condition that is to be executed when the touch sensor detects that the first operation on a position different from the object is executed, and wherein the computer program, when executed by the computer, causes the terminal apparatus to perform:

displaying a screen for prompting the user to change the execution condition common to all the page data on the display surface in response to the touch sensor detecting that the first operation on the position different from the object has changed to a fourth operation; and storing the condition information indicative of the changed execution condition in the memory as the condition information common to all the page data, in response to the touch sensor detecting that a touch operation of instructing a change of the execution condition is executed.

* * * * *